(12) United States Patent
Kozuki et al.

(10) Patent No.: US 7,976,979 B2
(45) Date of Patent: Jul. 12, 2011

(54) SECONDARY BATTERY AND METHOD FOR MANUFACTURING SECONDARY BATTERY

(75) Inventors: Kiyomi Kozuki, Osaka (JP); Tadashi Imai, Osaka (JP); Yasushi Hirakawa, Osaka (JP); Takashi Nonoshita, Osaka (JP)

(73) Assignee: Panasonic Corporation, Osaka (JP)

( * ) Notice: Subject to any disclaimer, the term of this patent is extended or adjusted under 35 U.S.C. 154(b) by 43 days.

(21) Appl. No.: 12/441,499

(22) PCT Filed: Jul. 3, 2007

(86) PCT No.: PCT/JP2007/063275
§ 371 (c)(1),
(2), (4) Date: Mar. 16, 2009

(87) PCT Pub. No.: WO2008/035495
PCT Pub. Date: Mar. 27, 2008

(65) Prior Publication Data
US 2009/0239139 A1    Sep. 24, 2009

(30) Foreign Application Priority Data
Sep. 20, 2006    (JP) .................................. 2006-254233

(51) Int. Cl.
H01M 2/26    (2006.01)
H01M 2/24    (2006.01)
H01M 6/42    (2006.01)
H01M 2/02    (2006.01)
H01M 6/08    (2006.01)

(52) U.S. Cl. .......... 429/161; 429/160; 429/164; 429/170
(58) Field of Classification Search .................. 429/160, 429/161, 164, 170; 228/244
See application file for complete search history.

(56) References Cited

U.S. PATENT DOCUMENTS
6,818,025 B1    11/2004    Ura
2006/0063069 A1    3/2006    Kim

FOREIGN PATENT DOCUMENTS

| | | |
|---|---|---|
| JP | 2000-294222 | 10/2000 |
| JP | 2004-172038 | 6/2004 |
| JP | 2004-220953 | 8/2004 |
| JP | 2004-296341 | 10/2004 |
| JP | 2006-093145 | 4/2006 |
| JP | 2006-172780 | 6/2006 |

*Primary Examiner* — Emily M Le
*Assistant Examiner* — Michael Forrest
(74) *Attorney, Agent, or Firm* — McDermott Will & Emery LLP

(57) ABSTRACT

An electrode group 4 having a positive electrode plate and a negative electrode plate arranged with a porous insulating layer interposed therebetween and end portions of the positive and negative electrode plates protruding from the porous insulating layer is prepared, and current collector plates 10 and 11 each of which is provided with a projection 12 having a gap 12a formed therein is prepared. With the end portion 2a of the electrode plate protruding from the porous insulating layer 3 kept in contact with a principle surface of the current collector plates 10 and 11, the projection 12 is locally heated to join the end portion 2a of the electrode plate and the current collector plates 10 and 11. the end portion 2a of the electrode plate is welded to the current collector plates 10 and 11 with a fused material obtained by fusing the projection 12.

3 Claims, 18 Drawing Sheets

FIG. 1
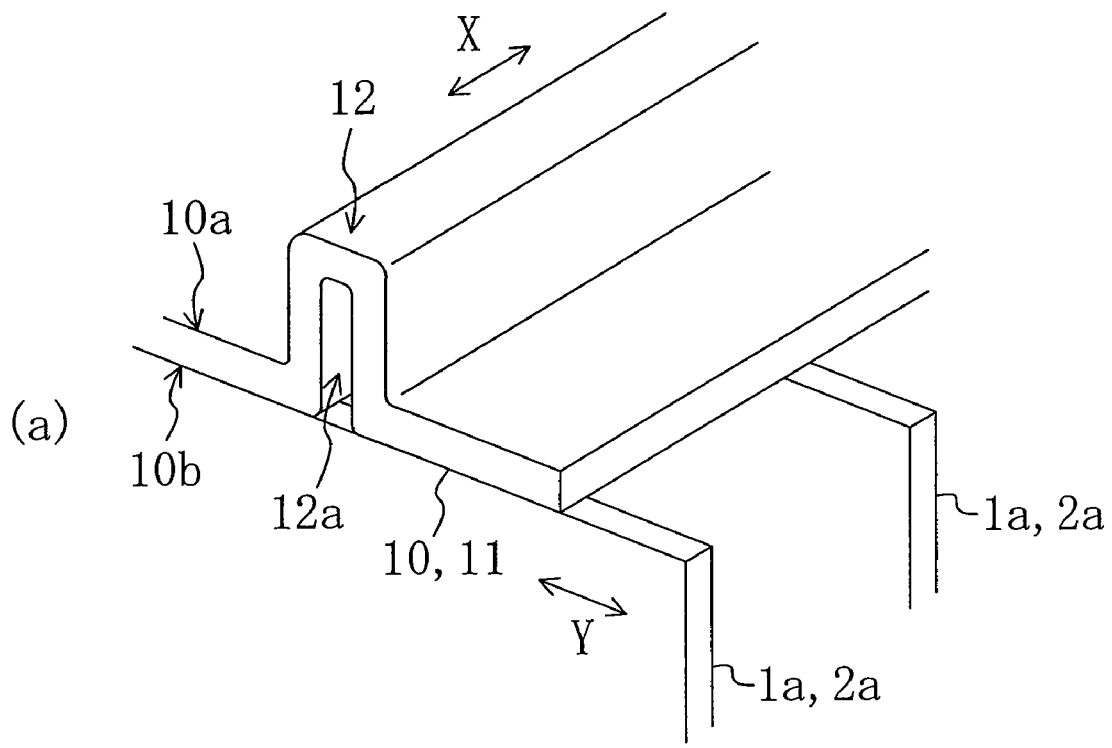
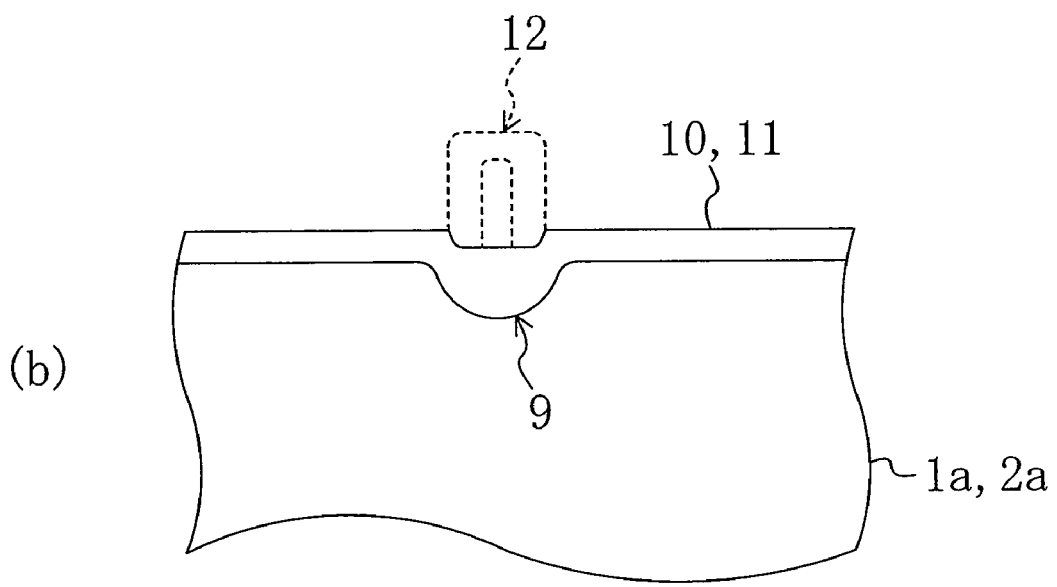

FIG. 3
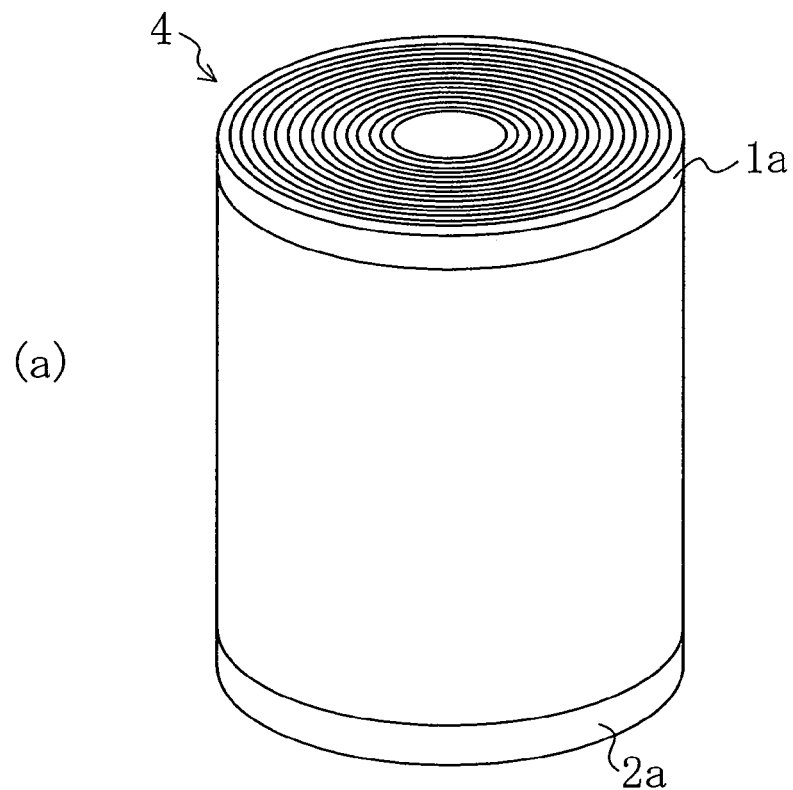
(a)
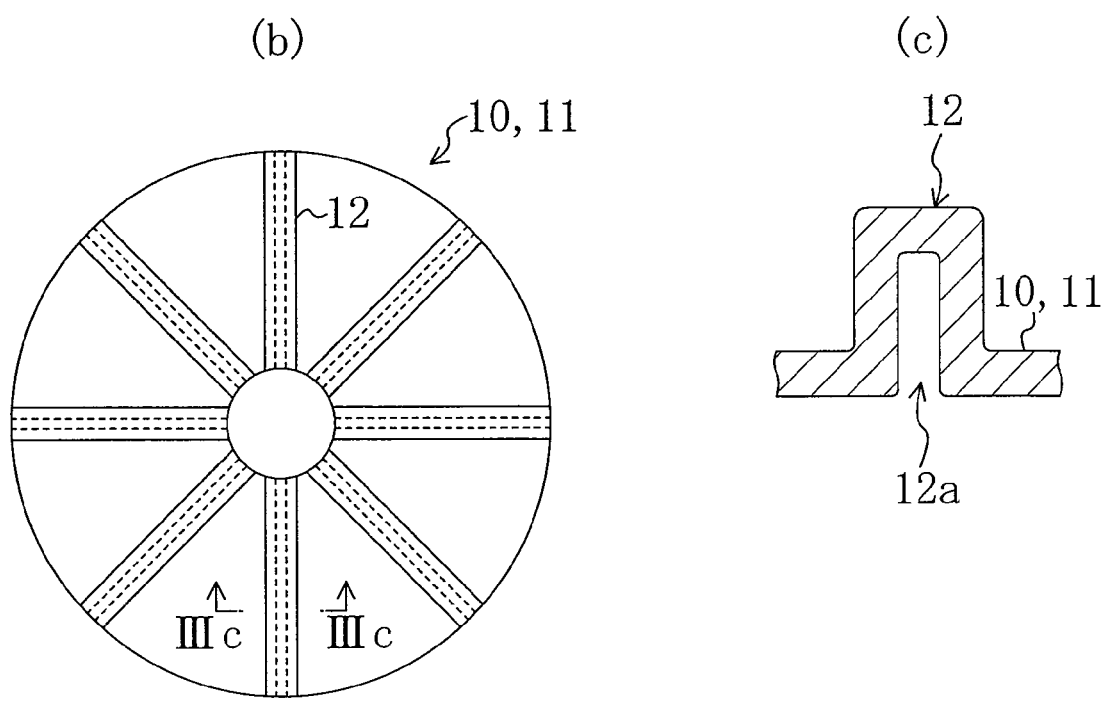
(b) (c)

FIG. 5
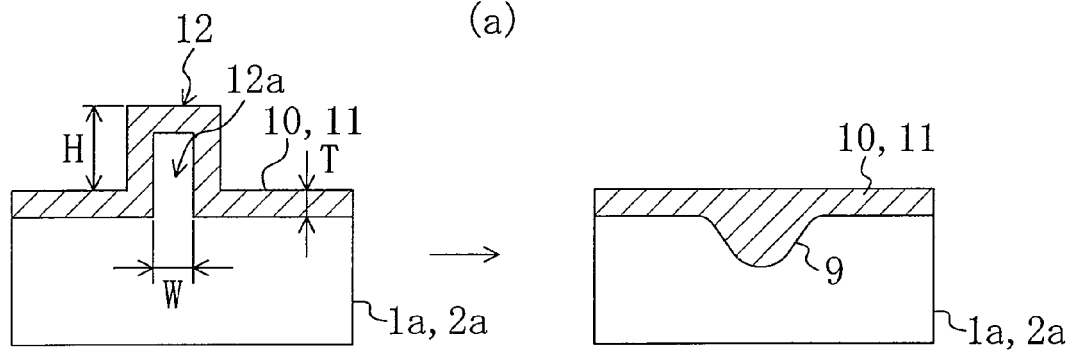
(a)
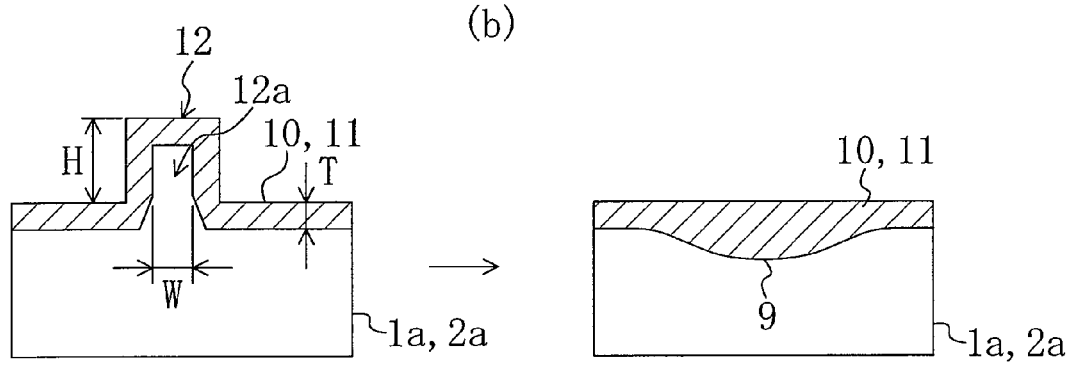
(b)
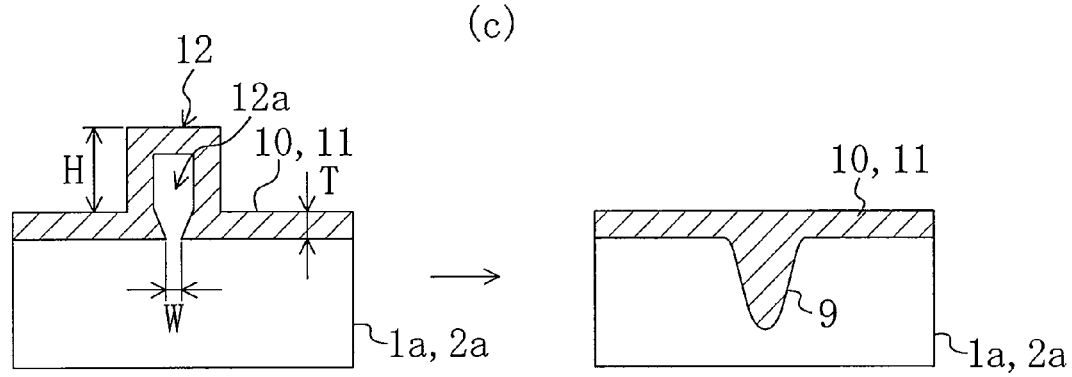
(c)

FIG. 7
(a)
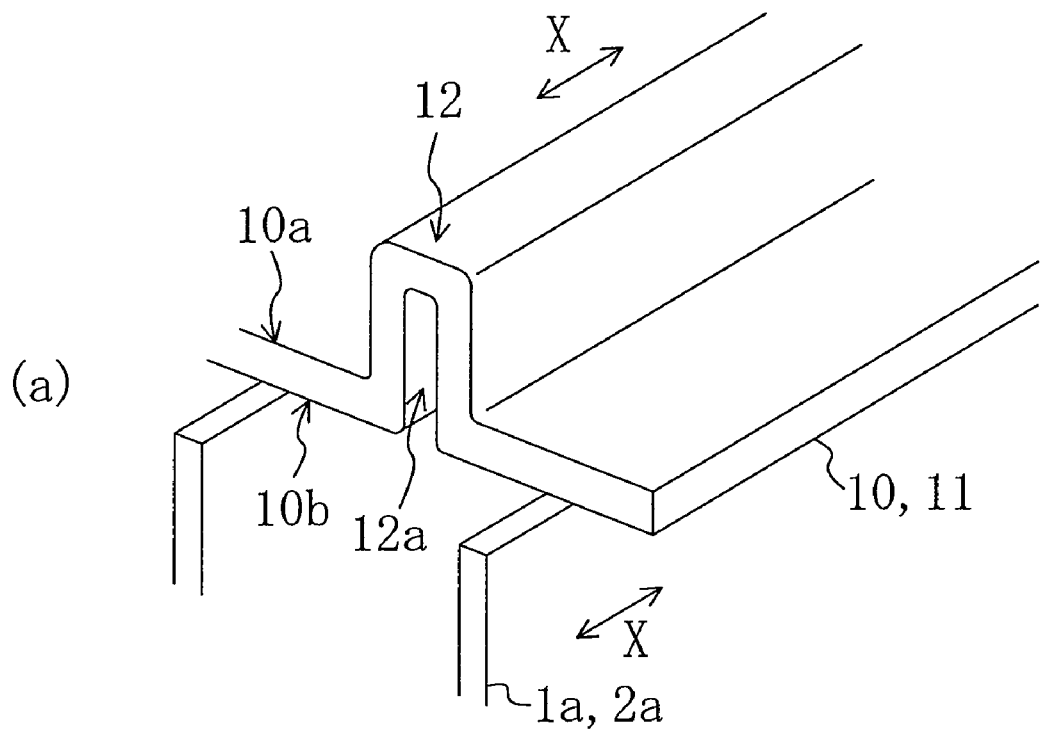
(b)
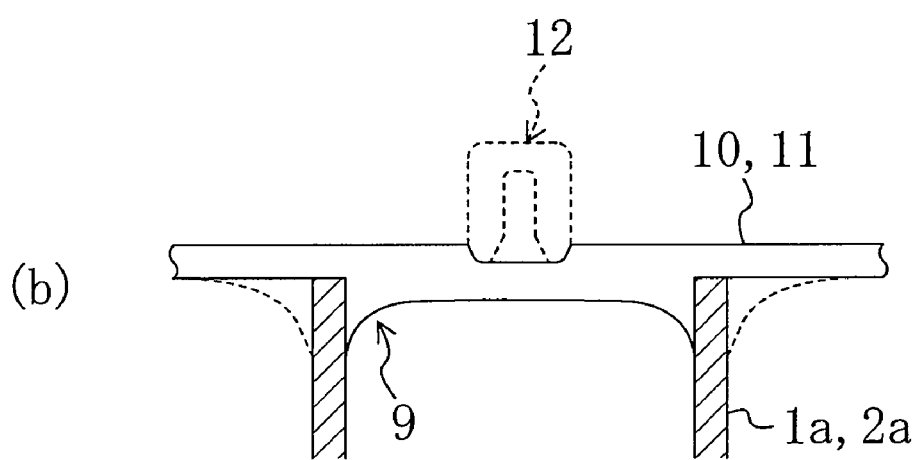

FIG. 9
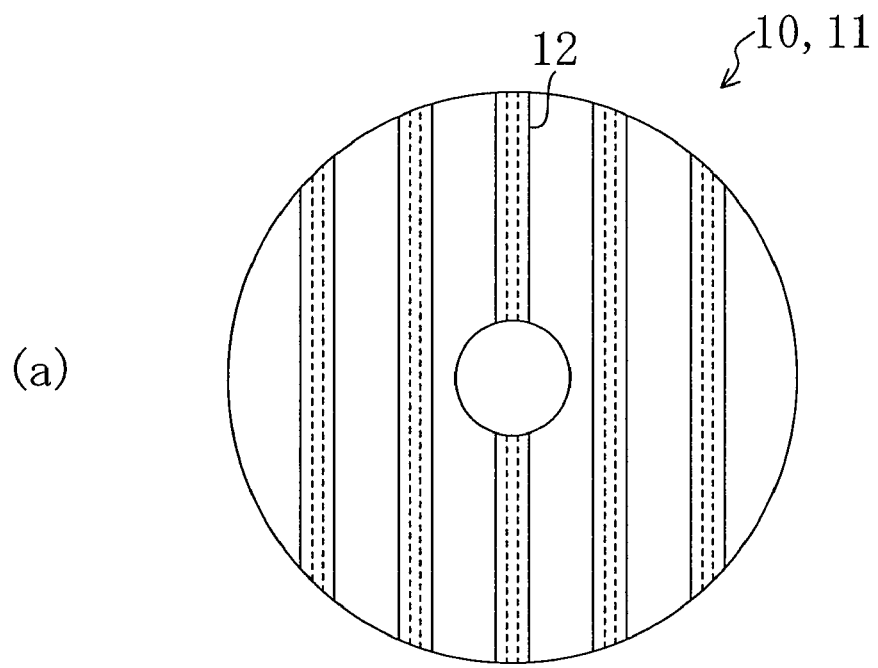
(a)
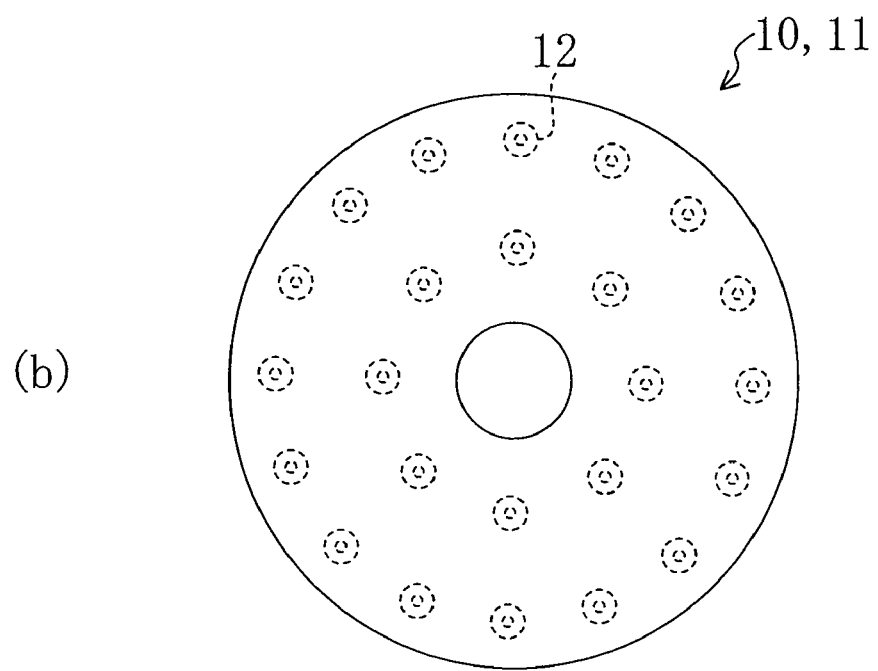
(b)

FIG. 10
(a)
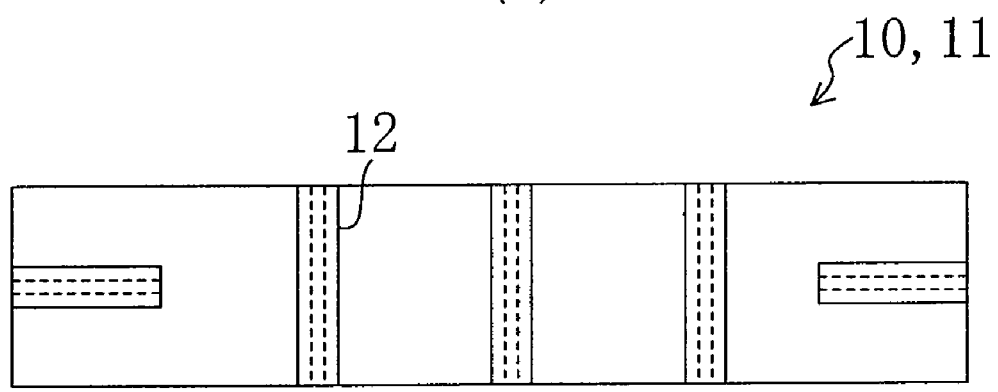
(b)
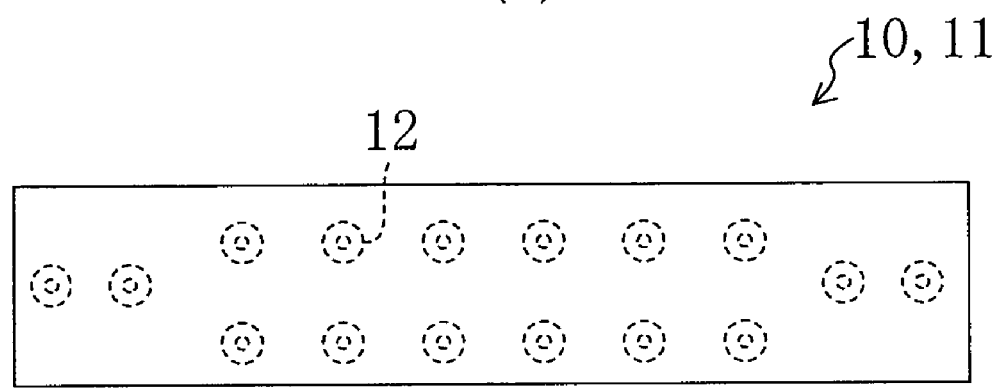

FIG. 11
(a)
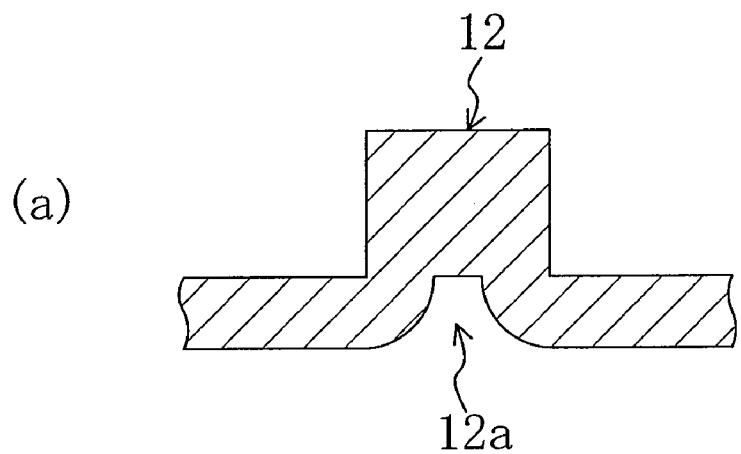
(b)
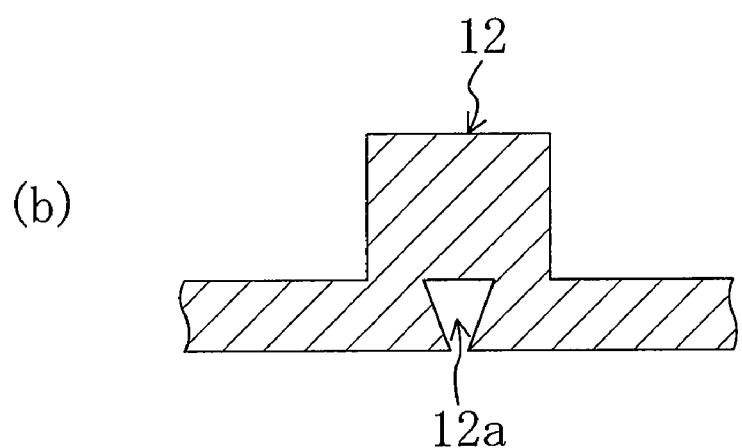
(c)
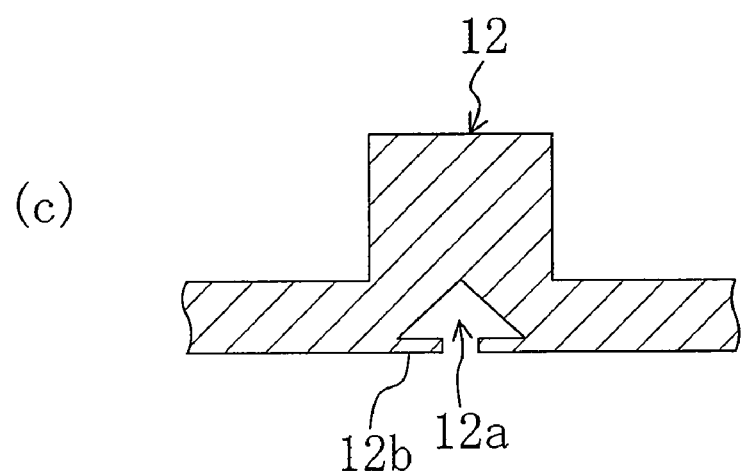

FIG. 14
(a) 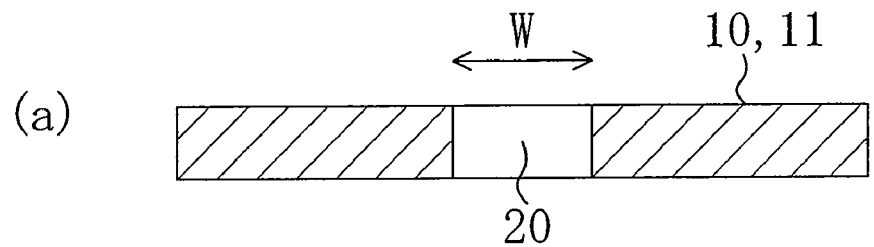
(b) 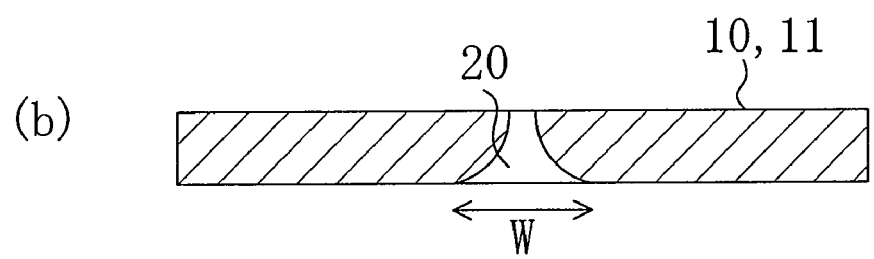
(c) 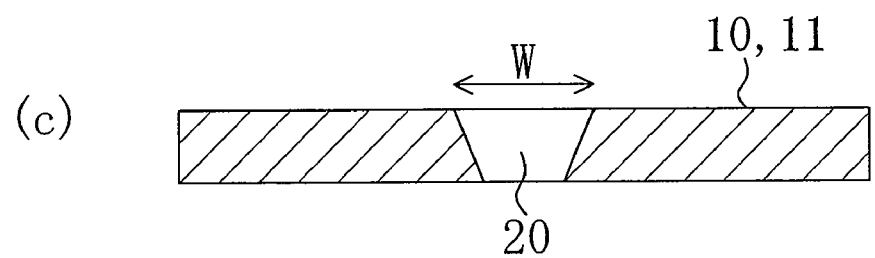
(d) 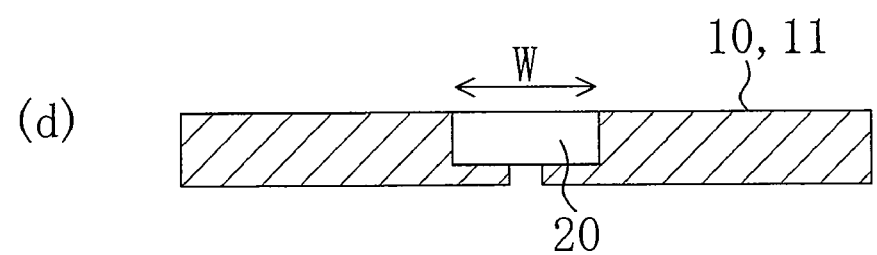

FIG. 15
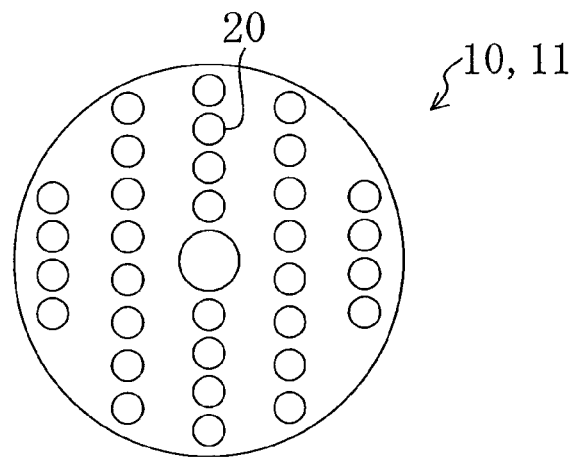
(a)
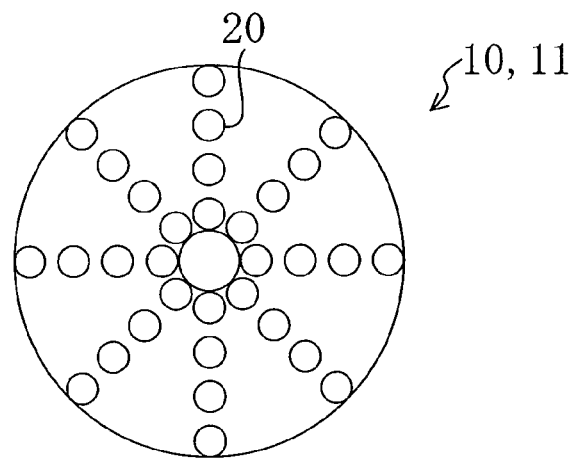
(b)
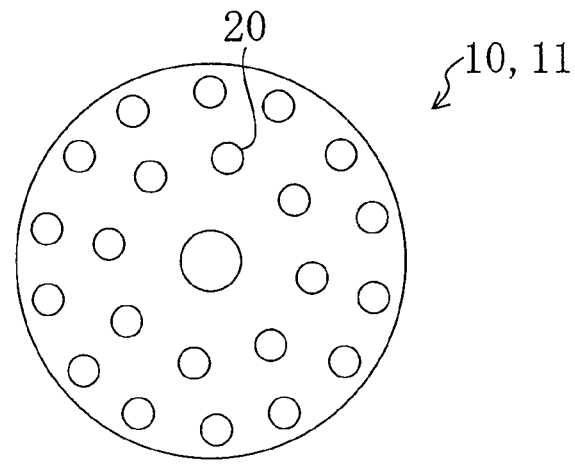
(c)

FIG. 16
PRIOR ART
(a) 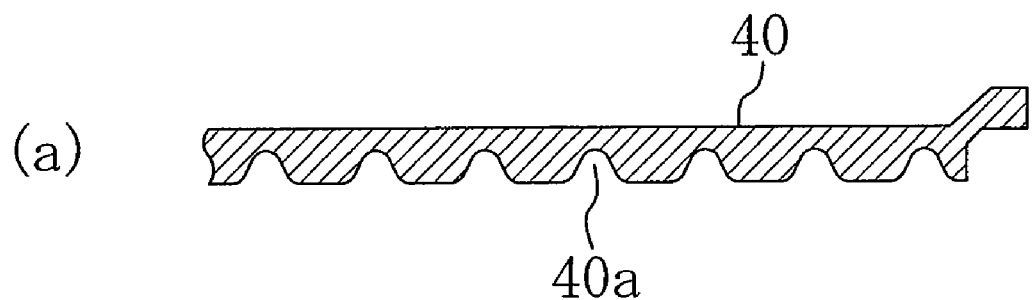
(b) 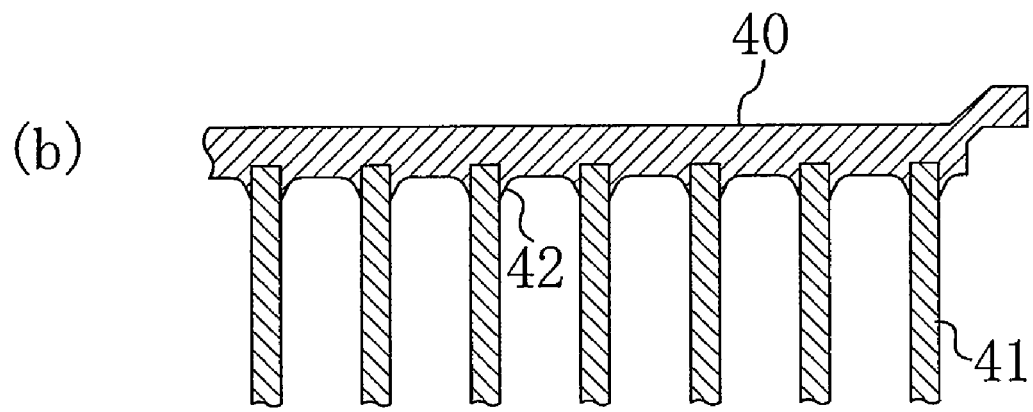

SECONDARY BATTERY AND METHOD FOR MANUFACTURING SECONDARY BATTERY

RELATED APPLICATIONS

This application is the U.S. National Phase under 35 U.S.C. §371 of International Application No. PCT/JP2007/063275 filed on Jul. 3, 2007, which in turn claims the benefit of Japanese Application No. 2006-254233, filed on Sep. 20, 2006, the disclosures of which Applications are incorporated by reference herein.

TECHNICAL FIELD

The present invention relates to secondary batteries aimed at increasing output power, particularly to secondary batteries having a low-resistance current collecting structure suitable for high current discharge.

BACKGROUND ART

Development of secondary batteries used as a driving power source has been proceeding in recent years as they are considered as one of important key devices. Among them, lightweight and small-sized nickel-hydrogen storage batteries and lithium ion secondary batteries having high energy density have widely been used as a driving power source of consumer devices such as cellular phones, and electric vehicles and electric tools. Recently, the lithium ion secondary batteries have been considered as a possible driving power source and active development has been conducted for higher capacity and high output power.

The secondary batteries used as the driving power source require a high output current. From this point of view, a secondary battery with a devised structure, particularly with a devised current collecting structure, has been proposed.

A current collecting structure formed by, for example, winding a positive electrode plate and a negative electrode plate with a separator interposed therebetween and welding the positive and negative electrode plates to current collector plates through current collector tabs, has been employed for the purpose of increasing an electrode area. In this current collecting structure, however, the current collector tabs have a high electrical resistance, and therefore current collecting efficiency is impaired. It has been difficult to apply this structure to the driving power source that requires a high output current.

A "tabless" current collecting structure formed by joining whole end portions of the positive and negative electrode plates to the current collector plates is suitable for high current discharge because it can reduce the electrical resistance. However, for the tabless current collection, it is necessary to join the end portions of the positive and negative electrode plates to the current collector plates with reliability.

FIGS. 16(a) and 16(b) show a current collecting structure described in Patent Document 1. FIG. 16(a) is a sectional view of a current collector plate 40 and FIG. 16(b) is a sectional view of the current collector plate 40 with the end portions of the positive electrode plates (or the negative electrode plates) 41 joined thereto.

As shown in FIG. 16(a), grooves 40a are formed in the surface of the current collector plate 40 at positions corresponding to the end portions of the positive electrode plates (or the negative electrode plates) 41. The end portions of the positive electrode plates (or the negative electrode plates) 41 are inserted into the grooves 40a. The end portions of the positive electrode plates (or the negative electrode plates) 41 are joined to the current collector plate 40 by fusing parts of the current collector plate 40 forming the grooves 40a.

In the current collecting structure formed by this method, the end portions of the positive electrode plates (or the negative electrode plates) 41 are welded to the current collector plate 40 at joints 42 as they are buried in metal comprising the current collector plate 40. Thus, the end portions of the positive electrode plates (or the negative electrode plates) 41 can reliably be joined to the current collector plate 40.

According to the aforementioned method, however, the grooves 40a in the current collector plate 40 have to be formed in correspondence with the arrangement of the positive electrode plates (or the negative electrode plates) 41 of the electrode group. This requires a technique for placing the end portions of the positive electrode plates (or the negative electrode plates) 41 in alignment with the grooves 40a to be inserted therein. As a result, production processes may be complicated and production cost may increase.

Patent Document 2 discloses a simple method that allows joining of the end portion of the positive electrode plate (or the negative electrode plate) 41 to the current collector plate 40 without alignment.

FIG. 17 is a sectional view of a current collecting structure of a secondary battery disclosed by Patent Document 2. As shown in FIG. 17, a positive electrode plate 51 and a negative electrode plate 52 slightly shifted from each other in the vertical direction are wound with a separator 53 interposed therebetween. End portions 51a and 52a of the positive and negative electrode plates 51 and 52 protruding from the separator 53 are welded to current collector plates 60 and 61, respectively. The end portions 51a and 52a of the positive and negative electrode plates 51 and 52 are pressed in a winding axis direction (the vertical direction in the FIG. 17) so that they form flat portions, and the flat portions are welded to the current collector plates 60 and 61, respectively.

In the current collecting structure formed by this method, the flat portions formed by the positive and negative electrode plates 51 and 52 themselves are brought into contact with the current collector plates 60 and 61 and welded thereto. Therefore, the end portions of the positive and negative electrode plates 51 and 52 can be joined to the current collector plates 60 and 61 by a simple method without alignment.

The aforementioned method has the following drawbacks from the viewpoint of increasing the capacity and reducing the size of the secondary battery. Specifically, when a current collector foil constituting the positive or negative electrode plate 51 or 52 is thinned down, the thinned down foils decrease in mechanical strength. This makes it difficult to form the uniformly bent flat portions by pressing the positive or negative electrode plate 51 or 52. In particular, aluminum and copper are used as the current collector foil used in the positive and negative electrode plates 51 and 52 of the lithium ion secondary battery. Therefore, when the current collector foil is thinned down to about 20 μm or less, for example, it will be very difficult to form the flat portions by pressing. Further, when the end portions 51a and 52a (portions uncoated with a material mixture) of the positive and negative electrode plates 51 and 52 are warped due to the pressing, the material mixture applied to portions 51b, 52b of the current collector foil coated with the material mixture may come off or break.

Patent Document 3 discloses a technology that allows joining of the end portion of the positive or negative electrode plate to the current collector plate even when the current collector foil constituting the positive or negative electrode plate is thinned down.

FIG. 18 is a perspective view illustrating the structure of a current collector plate 70 disclosed by Patent Document 3. As shown in FIG. 18, a first projection 70a and a second projection 70b project toward the opposite directions from the surfaces of the flat current collector plate 70. With the end portion of the positive electrode plate (or the negative electrode plate) 80 kept in contact with the second projection 70b, energy is applied to the first projection 70a to fuse the first projection 70a, part of the body of the flat current collector plate 70 and the second projection 70b so that the end portion of the positive electrode plate (or the negative electrode plate) 80 is joined to the current collector plate 70.

Regarding the current collecting structure formed by this method, the end portion of the positive electrode plate (or the negative electrode plate) 80 is just brought into contact with the second projection 70b of the current collector plate 70 so that it is joined to the current collector plate 70 with a fused material obtained by fusing the current collector plate 70. Therefore, even when the current collector foil constituting the positive electrode plate (or the negative electrode plate) 80 is thinned down and decreased in mechanical strength, the end portion of the positive electrode plate (or the negative electrode plate) 80 can be joined to the current collector plate 70 without applying any load to the current collector foil.

[Patent Document 1] Published Japanese Patent Application No. 2006-172780
[Patent Document 2] Published Japanese Patent Application No. 2000-294222
[Patent Document 3] Published Japanese Patent Application No. 2004-172038

DISCLOSURE OF THE INVENTION

Problem that the Invention is to Solve

According to the method of Patent Document 3, the end portion of the positive or negative electrode plate can be joined to the current collector plate even when the current collector foil of the positive or negative electrode plate is thinned down to increase the capacity and reduce the size of the secondary battery. However, this method involves the following drawbacks when it is applied to mass production.

According to the method of Patent Document 3, the first projection 70a, the part of the body of the flat current collector plate 70 and the second projection 70b to be fused are larger in volume than the body of the flat current collector plate 70. For example, when an excessive energy that may completely fuse the second projection 70b is applied, part of the body of the current collector plate 70 adjacent to the first and second projections 70a and 70b and having a small thermal capacity may also be fused. As a result, the fused material including that of the part of the body of the flat current collector plate 70 may drop from the body of the current collector plate 70. On the other hand, when an insufficient energy that may fuse only the first projection 70a is applied, the second projection 70b cannot be fused and the end portion cannot be welded. Further, a fused material obtained by fusing the current collector plate 70 cannot flow to part of the current collector plate 70 not in contact with the positive electrode plate (or the negative electrode plate) 80. Therefore, the fused material may possibly drop from the body of the current collector plate 70 by its own weight.

Since the control of the energy application to the current collector plate 70 is complicated, it will be difficult to join the end portion of the positive electrode plate (or the negative electrode plate) 80 to the current collector plate 70 with stability when this method is applied to the mass production. Further, when the fused material drops, a portion of the positive electrode plate (or the negative electrode plate) 80 coated with the material mixture may be damaged and the reliability may deteriorate.

In view of the aforementioned drawbacks, the present invention has been achieved to provide a secondary battery including a current collecting structure having a stable joint between the positive electrode plate (or the negative electrode plate) and the current collector plate and being suitable for high current discharge.

Means of Solving the Problem

Regarding the method disclosed by Patent Document 3, the inventors of the present invention have paid attention to the fact that the complicated control of the energy application to the current collector plate (the first projection) is needed by the configuration where the volume of part of the current collector plate to be fused is larger than the volume of the body of the current collector plate not to be fused, and have employed, in the secondary battery of the present invention, a current collector plate provided with a projection having a gap thereinside formed on part of a principle surface of the current collector plate. Specifically, the current collecting structure of the secondary battery of the present invention is configured by locally heating the projection with the end portion of the positive electrode plate (or the negative electrode plate) kept in contact with the current collector plate to weld the end portion of the positive electrode plate (or the negative electrode plate) to the current collector plate.

Since the projection has a gap thereinside, the volume of the part of the current collector plate to be fused is not very different from the volume of the body of the current collector plate not to be fused. Therefore, the amount of energy to be applied to the current collector plate (the projection) can easily be determined.

A fused material obtained by fusing the projection is quickly guided to the end portion of the positive electrode plate (or the negative electrode plate) through the gap. Therefore, a joint to the end portion of the positive electrode plate (or the negative electrode plate) can uniformly and reliably be welded. Further, the fused material obtained by fusing the projection remains in the gap by interfacial tension. Therefore, the dropping of the fused material from the current collector plate can be prevented even in part of the current collector plate not in contact with the positive electrode plate (or the negative electrode plate).

A method for manufacturing the secondary battery according to the present invention is a method for manufacturing a secondary battery including an electrode group having a positive electrode plate and a negative electrode plate arranged with a porous insulating layer interposed therebetween, the method comprising the steps of: (a) preparing the electrode group having the positive electrode plate and the negative electrode plate arranged in such a manner that the porous insulating layer is interposed therebetween and an end portion of at least one of the positive and negative electrode plates protrudes from the porous insulating layer; (b) preparing a current collector plate provided with a projection formed on one principle surface of the current collector plate and having a gap thereinside; (c) bringing the end portion of the electrode plate protruding from the porous insulating layer into contact with the other principle surface of the current collector plate; and (d) joining the end portion of the electrode plate to the current collector plate by locally heating the projection, wherein the end portion of the electrode plate is welded to the current collector plate in the step (d) with a fused material obtained by fusing the projection.

It is preferable that the fused material obtained by fusing the projection is guided to the end portion of the electrode plate through the gap so that the end portion of the electrode plate is welded to the current collector plate in the step (d).

According to this method, the fused material obtained by fusing the projection is quickly guided to the end portion of the electrode plate through the gap. Therefore, a joint to the end portion of the electrode group can uniformly and reliably be welded. Since the fused material obtained by fusing the projection remains in the gap by interfacial tension, the fused material can be prevented from dropping from the current collector plate even in part of the current collector plate not in contact with the positive electrode plate (or the negative electrode plate). This makes it possible to provide the secondary battery with a current collecting structure having a stable joint between the end portion of the electrode plate and the current collector plate and being suitable for high current discharge.

In a preferable embodiment, the projection is formed in a radial pattern on the one principle surface of the current collector plate. The electrode group is preferably configured of the positive electrode plate and the negative electrode plate wound with the porous insulating layer interposed therebetween.

In a preferable embodiment, the projection is formed on the one principle surface of the current collector plate to be parallel to a stacking direction of the positive electrode plate and the negative electrode plate. The electrode group is preferably configured of the positive electrode plate and the negative electrode plate stacked with the porous insulating layer interposed therebetween.

With this configuration, the end portion protruding from the porous insulating layer is in contact with the other principle surface of the current collector plate so that the end portion of the electrode plate is substantially orthogonal to the direction of the projection extending on the one principle surface of the current collector plate. Therefore, the end portion of the electrode plate can be welded reliably to the current collector plate.

It is preferable that the projection having the gap thereinside is formed integrally with the current collector plate by pressing the current collector plate made of a flat plate. With this configuration, the projection having the gap thereinside can be formed easily.

It is preferable that the projection has a height greater than a thickness of the current collector plate. With this configuration, a sufficient amount of the fused material can be fed to the joint to the end portion of the electrode plate.

It is preferable that the gap formed in the projection has a width not greater than the thickness of the current collector plate. With this configuration, the fused material obtained by fusing the current collector plate can be kept in the gap by sufficient interfacial tension even in part of the current collector plate not in contact with the electrode plate.

It is preferable that the gap formed in the projection has a width increased or decreased at an open end thereof. With this configuration, the width and depth of the joint between the electrode plate and the current collector plate can be controlled.

It is preferable that, in the step (c), every part of the end portion of the electrode plate of the electrode group is in contact with the other principle surface of the current collector plate. With this configuration, spark can be prevented from occurring at the end portion of the electrode plate in the welding process.

It is preferable that, in the step (d), at least two or more parts of the end portion of the electrode plate are welded to the current collector plate with the fused material obtained by fusing the projection formed on the other principle surface of the current collector plate.

Another method for manufacturing a secondary battery according to the present invention is a method for manufacturing a secondary battery including an electrode group having a positive electrode plate and a negative electrode plate arranged with a porous insulating layer interposed therebetween, the method comprising the steps of: (a) preparing the electrode group having the positive electrode plate and the negative electrode plate arranged in such a manner that the porous insulating layer is interposed therebetween and an end portion of at least one of the positive and negative electrode plates protrudes from the porous insulating layer; (b) preparing a current collector plate provided with a plurality of through holes; (c) bringing the end portion of the electrode plate protruding from the porous insulating layer into contact with the other principle surface of the current collector plate; and (d) joining the end portion of the electrode plate to the current collector plate by feeding fused metal to the through holes, wherein the end portion of the electrode plate is welded to the current collector plate in the step (d) with the fused metal guided to the end portion of the electrode plate through the through holes. The size of each through hole is preferably not greater than a thickness of the current collector plate.

With this configuration, the fused metal fed to the through holes can be quickly guided to the end portion of the electrode plate through the through holes. Therefore, a joint to the end portion of the electrode plate can uniformly and reliably be welded. Further, the fused metal fed to the through holes remains in the through holes by interfacial tension. Therefore, the fused metal can be prevented from dropping from the current collector plate even in part of the current collector plate not in contact with the current collector plate. This makes it possible to provide the secondary battery with a current collecting structure having a stable joint between the end portion of the electrode plate and the current collector plate and being suitable for high current discharge.

The fused metal is preferably a fused material obtained by heating and fusing a welding rod.

The secondary battery according to the present invention includes an electrode group having a positive electrode plate and a negative electrode plate arranged with a porous insulating layer interposed therebetween, wherein an end portion of at least one of the positive and negative electrode plates protrudes from the porous insulating layer, and the protruding end portion of the electrode plate is in contact with one principle surface of the current collector plate and joined to the current collector plate, and the end portion of the electrode plate is welded to the current collector plate as a fused material obtained by fusing a projection formed on the other principle surface of the current collector plate is guided to the end portion of the electrode plate through a gap formed in the projection.

With this configuration, the fused material obtained by fusing the projection is quickly guided to the end portion of the electrode plate through the gap. Therefore, a joint to the end portion of the electrode plate can uniformly and reliably be welded. Even in part of the current collector plate not in contact with the electrode plate, the fused material obtained by fusing the current collector plate remains in the gap without dropping from the current collector plate. This makes it possible to provide the secondary battery with a current collecting structure having a stable joint between the end portion of the electrode plate and the current collector plate and being suitable for high current discharge.

It is preferable that the electrode group is configured of the positive electrode plate and the negative electrode plate wound with the porous insulating layer interposed therebetween, and a joint with the end portion of the electrode plate is preferably formed on the one principle surface in a radial pattern. Alternatively, it is preferable that the electrode group is configured of the positive electrode plate and the negative electrode plate stacked with the porous insulating layer interposed therebetween, and a joint with the end portion of the electrode plate is preferably formed on the one principle surface to be parallel to a stacking direction of the positive electrode plate and the negative electrode plate.

With this configuration, the end portion of the electrode plate protruding from the porous insulating layer is in contact with the other principle surface of the current collector plate so that the end portion of the electrode plate is substantially perpendicular to the direction of the projection extending on the one principle surface of the current collector plate. Thus, a joint reliably welded to the end portion of the electrode plate can be obtained.

It is preferable that part of the other principle surface corresponding to the joint to the end portion of the electrode plate is dished. With this configuration, the state of the welded joint to the end portion of the electrode plate can be checked visually.

Effect of the Invention

Regarding the secondary battery of the present invention, with the end portion of the positive electrode plate (or the negative electrode plate) kept in contact with the current collector plate provided with a projection each having a gap thereinside, the projection is fused so that the fused material obtained by fusing the projection is quickly guided to the end portion of the positive electrode plate (or the negative electrode plate) through the gap. In this way, the end portion of the positive electrode plate (or the negative electrode plate) can uniformly and reliably be welded. Since the fused material obtained by fusing the projection remains in the gap by interfacial tension, the fused material can be prevented from dropping from the current collector plate even in part of the current collector plate not in contact with the positive electrode plate (or the negative electrode plate). This makes it possible to provide the secondary battery with a current collecting structure having a stable joint between the positive electrode plate (or the negative electrode plate) and the current collector plate and being suitable for high current discharge.

BRIEF DESCRIPTION OF DRAWINGS

FIGS. 1(a) and 1(b) illustrate a current collecting structure of a secondary battery according to a first embodiment of the present invention. FIG. 1(a) illustrates an end portion of an electrode plate in contact with a current collector plate and FIG. 1(b) illustrates the end portion of the electrode plate joined to the current collector plate.

FIG. 3(a) is a perspective view illustrating the structure of an electrode group of the secondary battery of the first embodiment, FIG. 3(b) is a plan view illustrating the structure of the current collector plate and FIG. 3(c) is a sectional view of a projection taken along the line IIIc-IIIc of FIG. 3(b).

FIGS. 5(a)-5(c) are views illustrating the shapes of the projections and the shapes of joints according to the first embodiment.

FIGS. 7(a) and 7(b) are views illustrating the current collecting structure of the first embodiment. FIG. 7(a) illustrates the end portion of the electrode plate in contact with the current collector plate and FIG. 7(b) illustrates the end portion of the electrode plate joined to the current collector plate.

FIGS. 9(a) and 9(b) are plan views illustrating the structure of a current collector plate according to a modification of the first embodiment.

FIGS. 10(a) and (b) are plan views illustrating the structure of the current collector plate according to the modification of the first embodiment.

FIGS. 11(a)-11(c) are sectional views illustrating the shapes of the projections according to the modification of the first embodiment.

FIGS. 14(a)-14(d) are sectional views illustrating the structure of a current collector plate according to a second embodiment of the present invention.

FIGS. 15(a)-15(c) are plan views illustrating the arrangement of through holes according to the second embodiment.

FIGS. 16(a) and 16(b) illustrate a current collecting structure of a conventional secondary battery. FIG. 16(a) shows the structure of a current collector plate and FIG. 6(b) shows an end portion of an electrode plate joined to the current collector plate.

EXPLANATION OF REFERENCE NUMERALS

Figure 2:
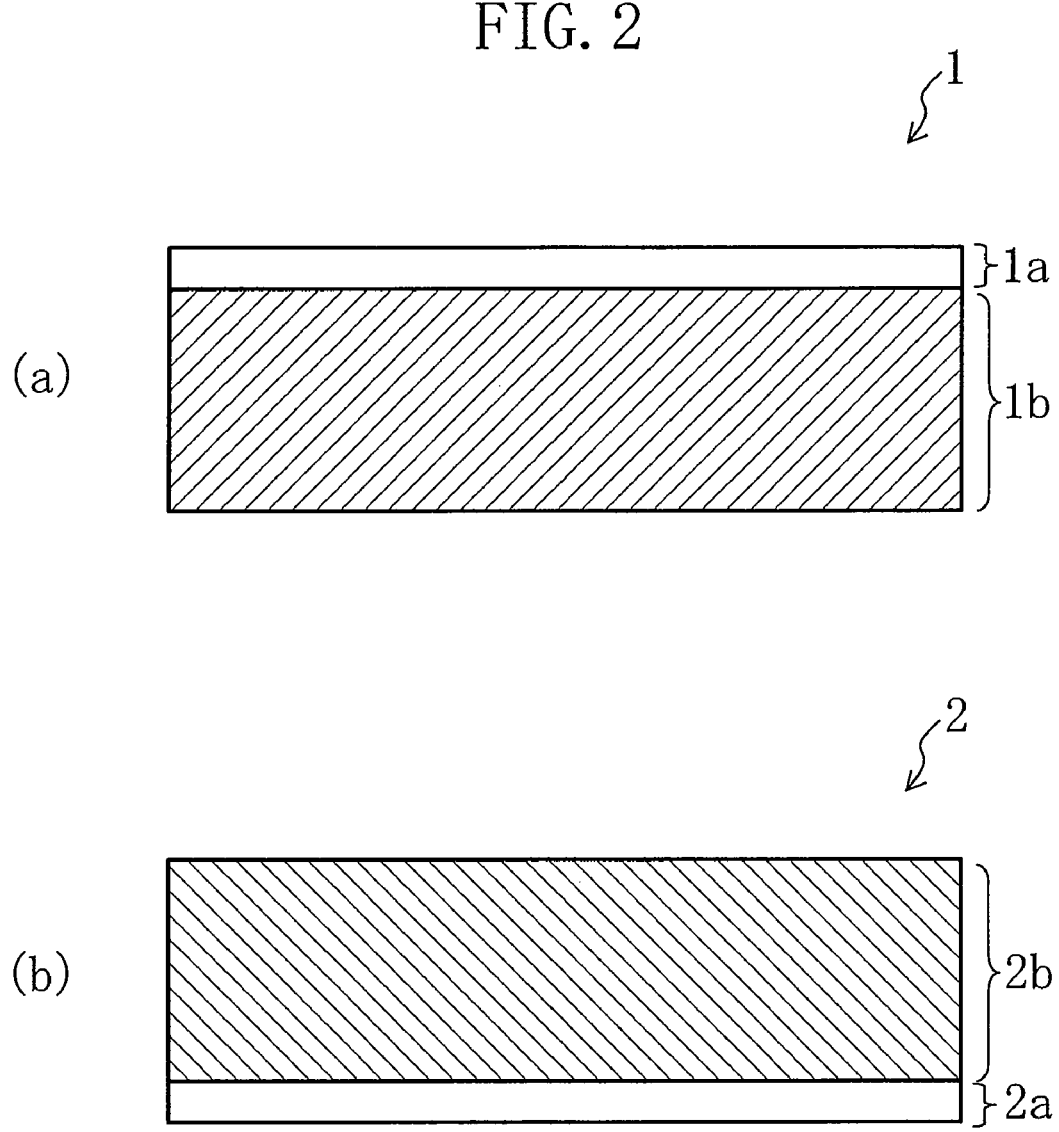
FIGS. 2(a) and 2(b) are developed views of a positive electrode plate and a negative electrode plate of the secondary battery of the first embodiment.

1 Positive electrode plate
1a End portion of positive electrode plate (portion uncoated with positive electrode material mixture)
1b Positive electrode material mixture-coated portion
2 Negative electrode plate
2a End portion of negative electrode plate (portion uncoated with negative electrode material mixture)
2b Negative electrode material mixture-coated portion
3 Porous insulating layer
4 Electrode group
9 Joint
10 Positive electrode current collector plate
11 Negative electrode current collector plate
12 Projection
12a Gap
13 Battery case
15 Positive electrode lead
16 Sealing plate 117 Gasket
20 Through hole

BEST MODE FOR CARRYING OUT THE INVENTION

Hereinafter, embodiments of the present invention will be described with reference to the drawings. In the following drawings, components having substantially the same function will be indicated by the same reference numerals for easy explanation. The embodiments do not limit the present invention.

First Embodiment

FIGS. 1(a) and 1(b) schematically show a current collecting structure of a secondary battery according to a first embodiment of the present invention. FIG. 1(a) is a perspective view illustrating an end portion 1a of a positive electrode plate in contact with a positive electrode current collector plate 10 and FIG. 1(b) is a sectional view illustrating the end portion 1a of the positive electrode plate joined to the positive electrode current collector plate 10. The present invention is also applicable to an end portion 2a of a negative electrode plate and a negative electrode current collector plate 11. Therefore, in the following explanation, the positive and negative electrode plates and the positive and negative current collector plates may be simply referred to as the electrode plates and the current collectors without distinction by polarities. Of course, the present invention may be applied only to the electrode plate and the current collector plate having either one of the polarities.

As shown in FIG. 1(a), a projection 12 having a gap 12a therein is formed on part of one principle surface 10a (a top surface in the figure) of the current collector plate 10. An end portion 1a of the electrode plate protruding from a porous insulating layer to be described later is in contact with the other principle surface 10b of the current collector plate 10. The projection 12 extends in a direction (a direction of an arrow X) substantially orthogonal to a direction in which the end portion 1a of the electrode plate extends (a direction of an arrow Y).

In this state, the projection 12 is fused by locally heating it. Then, as shown in FIG. 1(b), a fused material obtained by fusing the projection 12 is guided to the end portion 1a of the electrode plate through the gap 12a so that a joint 9 between the end portion 1a of the electrode plate and the current collector plate 10 is welded with the fused material. Since the projection 12 is fused with a certain width, both surfaces of the end portion 1a of the electrode plate are welded with the fused material. When the projection 12 is fused with a certain width reaching to part of the current collector plate in contact with an adjacent part of the electrode plate, two or more parts of the end portion 1a of the electrode plate can be simultaneously welded to the current collector plate 10. In this case, the fused material obtained by fusing the projection 12 flows onto part of the current collector plate 10 not in contact with the end portion 1a of the electrode plate. However, even in this part, the fused material remains in the gap 12a by interfacial tension and does not drop from the current collector plate 10.

The projection 12 in the fused state is fed to the joint 9 of the end portion of the electrode plate. Therefore, as shown in FIG. 1(b), part of the surface of the current collector plate 10 corresponding to the joint 9 with the end portion 1a of the electrode plate has been formed is dished. This allows visual check of the state of the welded joint 9 of the end portion 1a of the electrode plate.

When a current collector constituting the electrode plate is thin, the end portion 1a of the electrode plate is preferably brought into contact with the current collector plate 10 to be substantially perpendicular to the current collector plate 10 so as to prevent the end portion 1a of the electrode plate from deformation when it is attached to the current collector plate 10. In this way, the fused material obtained by fusing the projection 12 can be guided uniformly to both surfaces of the end portion 1a of the electrode plate, and the joint 9 can be provided with more stability.

Hereinafter, a specific method for manufacturing a secondary battery of the present invention will be explained with reference to FIGS. 2-4.

First, a positive electrode plate 1 shown in FIG. 2(a) including a positive electrode current collector having a portion 1b coated with a positive electrode material mixture in a direction of its width and a portion 1a uncoated with the positive electrode material mixture, and a negative electrode plate 2 shown in FIG. 2(b) including a negative electrode current collector having a portion 2b coated with a negative electrode material mixture in a direction of its width and a portion 2a uncoated with the negative electrode material mixture are prepared.

Then, the positive and negative electrode plates 1 and 2 are arranged with a porous insulating layer (not shown) interposed therebetween so that an end portion of the positive electrode plate 1 (the uncoated portion 1a) and an end portion of the negative electrode plate 2 (the uncoated portion 2a) protrude from the porous insulating layer in the opposite directions, and then the electrode plates 1 and 2 are wound into spiral to form an electrode group 4.

The porous insulating layer may be a microporous film made of a resin having a shut-down function, or a layered film of the microporous film and a heat-resistant porous film containing insulating particles and having no shut-down function.

As shown in FIG. 3(b), a positive electrode current collector plate 10 and a negative electrode current collector plate 11, both are disc-shaped, are prepared. Then, radially extending projections 12 are formed on their surfaces. FIG. 3(c) is a sectional view of the projection 12 taken along the line IIIc-IIIc of FIG. 3(b). A gap 12a is formed in each projection 12. For example, the projections 12 having the gaps therein can be formed integrally with the current collector plate 10, 11 by pressing the plate current collector plate 10, 11 made of a flat plate. The current collector plate 10, 11 may be formed by cutting or forging, instead of pressing.

The positive and negative electrode plate 1, 2 is wound into a spiral. Therefore, every part of the end portion 1a, 2a of the electrode is substantially orthogonal to the projections 12 radially extending on the surfaces of the current collector plate 10, 11.

The electrode group 4 shown in FIG. 3(a) is brought into contact with the current collector plate 10, 11 shown in FIG. 3(b) in the state shown in FIG. 1(a), and the projections 12 are locally heated. As a result, the end portion 1a, 2a of the electrode and the current collector plate 10, 11 are welded with a fused material obtained by fusing the projections 12. Since every part of the end portion 1a, 2a of the electrodes is substantially orthogonal to the projections 12 formed on the surfaces of the current collector plate 10, 11, the end portion 1a, 2a of the electrode can reliably be welded to the current collector plate 10, 11.

As shown in FIG. 3(b), every part of the end portion 1a, 2a of the electrode group 4 is preferably in contact with the surface of the current collector plate 10, 11. If part of the end portion 1a, 2a of the electrodes protrudes from the surface of the current collector plate 10, 11, the protruding part may generate a spark in the welding process and the end portions may not be welded stably.

Figure 4:
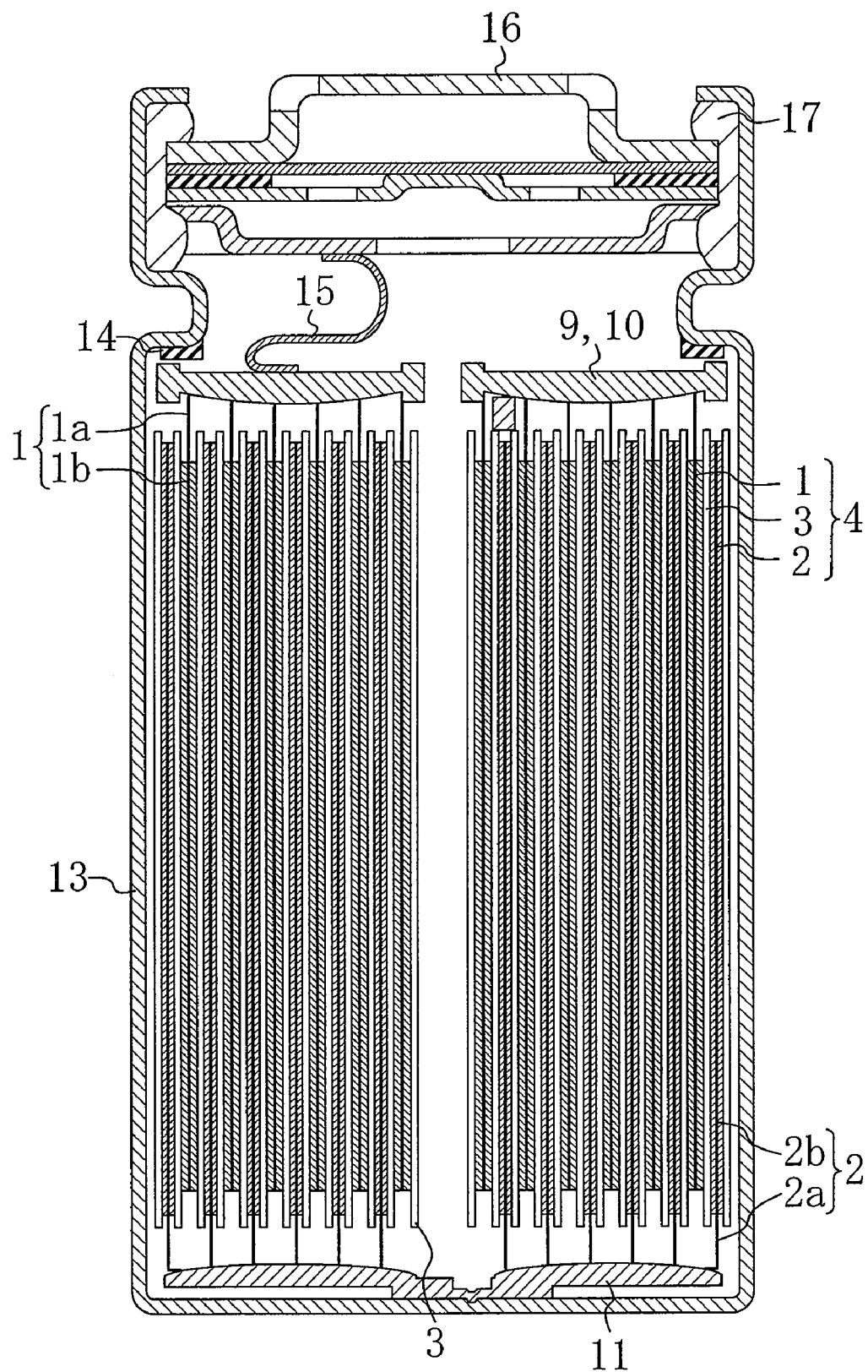
FIG. 4 is a sectional view illustrating the structure of the secondary battery of the first embodiment.

FIG. 4 is a sectional view illustrating the structure of a secondary battery completed by placing the current collecting structure formed by the foregoing method into a battery case 13. The negative electrode current collector plate 11 is connected to the bottom of the battery case 13 and the positive electrode current collector plate 10 is connected to a sealing plate 16 via a positive electrode lead 15. The battery case 13 contains a nonaqueous electrolyte (not shown) and sealed with the sealing plate 16 with a gasket interposed therebetween.

In the secondary battery manufactured by the foregoing method, the fused material obtained by fusing the projections 12 is quickly guided to the end portion 1a, 2a of the electrode through the gaps 12a. Therefore, the joint of the end portion 1a, 2a of the electrode can uniformly and reliably be welded. In a part of the current collector plate 10, 11 not in contact with the end portion 1a, 2a of the electrode, the fused material obtained by fusing the projections 12 remains in the gaps 12a, and does not drop from the current collector plate 10, 11. Therefore, the secondary battery can be provided with a highly reliable current collecting structure which has a stable joint between the end portion 1a, 2a of the electrode and the current collector plate 10, 11, and is suitable for high current discharge.

As a result of a close study on the shape of the projections 12, the inventors of the present invention have found that changing the shape of the gaps 12a of the projections 12 makes it possible to control the shape of the joint 9 formed on the end portion 1a, 2a of the electrode.

FIGS. 5(a)-5(c) schematically show the relationship between the shape of the gap 12a formed inside the projection 12 and the shape of the joint 9 on the end portion 1a, 2a of the electrode. In FIGS. 5(a)-5(c), left views illustrate the end portion 1a, 2a of the electrode in contact with the current collector plate 10, 11 and right views illustrate the end portion 1a, 2a of the electrode welded to the current collector plate 10, 11 by fusing the projection 12.

The gap 12a of the projection 12 shown in FIG. 5(a) has an almost uniform width W. In this case, the fused material obtained by fusing the projection 12 flows on both surfaces of the end portion 1a, 2a of the electrode to form the joint 9 on the end portion 1a, 2a of the electrode.

In contrast with this, the width W of the gap 12a of the projection 12 shown in FIG. 5(b) is increased at its open end. In this case, the fused material obtained by fusing the projection 12 flows on both surfaces of the end portion 1a, 2a of the electrode to form the joint 9 of a wide and shallow shape on the end portion 1a, 2a of the electrode.

The width W of the gap 12a of the projection 12 shown in FIG. 5(c) is decreased at its open end. In this case, the fused material obtained by fusing the projection 12 flows on both surfaces of the end portion 1a, 2a of the electrode to form the joint 9 of a narrow and deep shape on the end portion 1a, 2a of the electrode.

By varying the shape of the gap 12a formed inside the projection 12 as described above, the shape of the joint 9 on the end portion 1a, 2a of the electrode can be changed. Therefore, for example, the gap 12a may have the shape as shown in FIG. 5(b) for welding a plurality of end portions 1a, 2a of the electrodes at the same time, or the gap 12a may have the shape shown in FIG. 5(c) for increasing the area of the joint 9 to enhance the joining.

In order to feed a sufficient amount of the fused material to form the joint 9, the projection 12 may preferably have a height H greater than a thickness T of the current collector plate 10, 11. When the height H of the projection 12 is increased without changing the thickness of the current collector plate 10, 11, the thickness of the projection 12 remains unchanged. Therefore, the amount of energy applied to the projection 12 can be kept constant. Since the fused material obtained by fusing the projection 12 is continuously and quickly guided to the end portion 1a, 2a of the electrode through the gap 12a, the joint of the end portion 1a, 2a of the electrode can uniformly and reliably be welded.

The width W of the gap 12a inside the projection 12 is preferably not more than the thickness T of the current collector plate 10, 11. Specifically, the width W may preferably be 0.5 mm or less, more preferably 0.2 mm or less. With the thus-controlled width, the fused material obtained by fusing the current collector plate 10, 11 remains in the gap 12a by interfacial tension even in part of the current collector plate 10, 11 not in contact with the electrode 1 or 2. Therefore, the fused material is prevented from dropping from the current collector plate 10, 11 with more reliability. A suitable width W of the gap 12a can suitably be defined according to the material of the current collector plate 10, 11 and heating conditions for fusing the projection 12.

Figure 6:
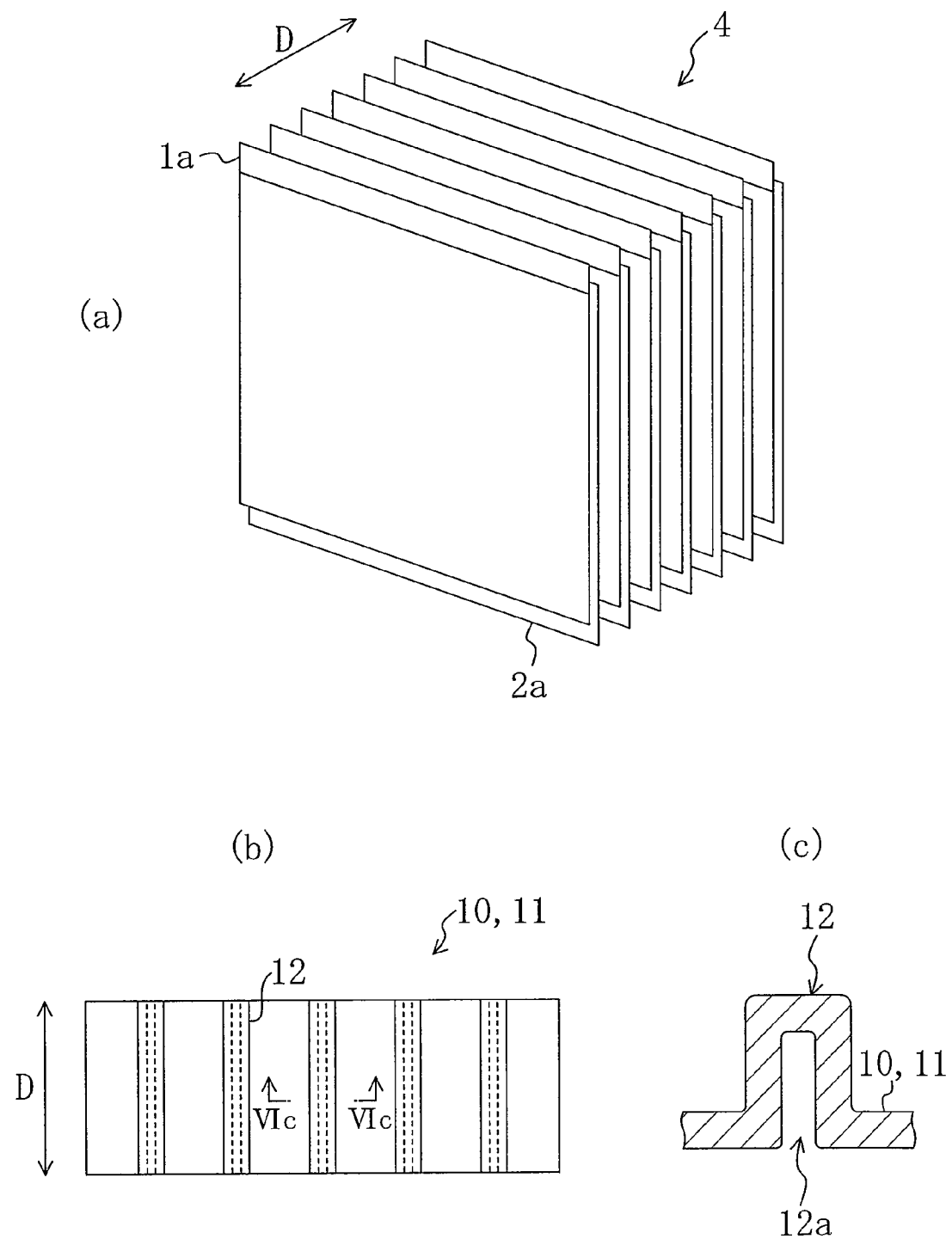
FIG. 6(a) is a perspective view illustrating the structure of the electrode group of the first embodiment.
FIG. 6(b) is a plan view illustrating the structure of the current collector plate and FIG. 6(c) is a sectional view of the projection taken along the line VIc-Vic of FIG. 6(b).

The electrode group 4 shown in FIG. 3(a) is formed by winding the positive electrode plate 1 and the negative electrode plate 2 with the porous insulating layer interposed therebetween. However, the electrode group may be formed by stacking the positive and negative electrode plates 1 and 2 with the porous insulating layer (not shown) interposed therebetween as shown in FIG. 6(a). In this case, the electrode group 4 is formed by stacking the positive and negative electrode plates 1 and 2 with the porous insulating layer interposed therebetween so that the end portion 1a of the positive electrode plate 1 and the end portion 2a of the negative electrode plate 2 protrude toward the opposite directions from the porous insulating layer.

For the stacked electrode group 4, rectangular current collector plates 10 and 11 as shown in FIG. 6(b) are used. The projections 12 formed on the surface of the current collector plate 10, 11 are to be arranged parallel to the stacking direction (a direction of an arrow D) of the positive and negative electrode plates 1 and 2. A gap 12a is formed in each projection 12 as shown in FIG. 6(c).

The stacking direction of the positive and negative electrode plates 1 and 2 and the extending direction of the projections 12 are parallel to each other. Therefore, every part of the end portions 1a and 2a of the positive and negative electrode plates 1 and 2 is substantially orthogonal to the projections 12 formed on the surfaces of the current collector plates 10 and 11.

The electrode group 4 shown in FIG. 6(a) is brought into contact with the current collector plate 10, 11 of FIG. 6(b) and the projections 12 are locally heated so that the end portion 1a, 2a of the electrode can uniformly and reliably be welded to the current collector plate 10, 11 with fused the material obtained by fusing the projections 12.

As shown in FIG. 1(a), the end portion 1a, 2a of the electrode is preferably orthogonal to the projections 12 formed on the surface of the current collector plate 10, 11. However, the advantage of the present invention can be obtained, for example, even when the end portion 1a, 2a of the electrode is parallel to the extending direction of the projections 12 as shown in FIG. 7(a).

In this case, the gap 12a formed in each projection 12 is preferably shaped to have the width W increased at its open end as shown in FIG. 5(b). With such shape, the fused material obtained by fusing the projection 12 flows widely on the bottom surface of the current collector plates 10, 11. Therefore, as shown in FIG. 7(b), the fused material is fed to the joint 9 of the end portion 1a, 2a of the electrode apart from the projection 12. Thus, the end portion 1a, 2a of the electrode can be welded to the current collector plate 10, 11.

Figure 8:
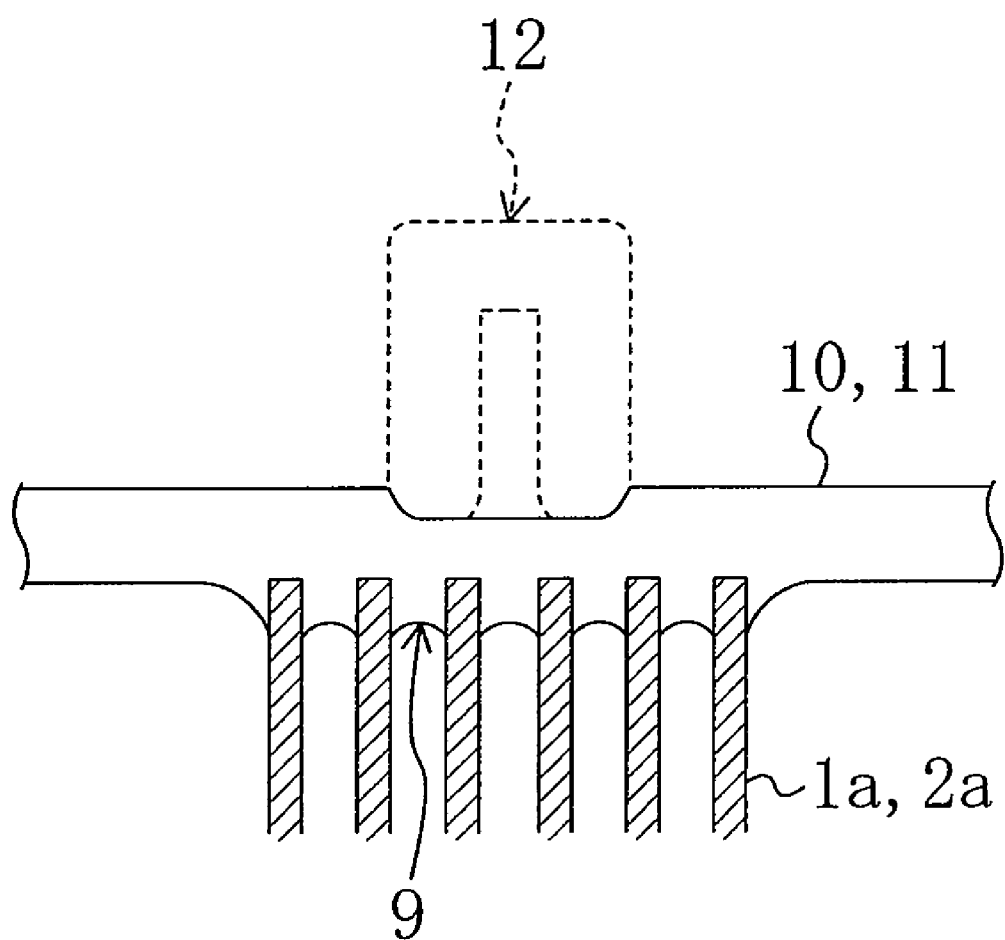
FIG. 8 is a view illustrating the end portion of the electrode plate of the first embodiment joined to the current collector plate.

As shown in FIG. 8, when the electrodes comprising the electrode group are arranged with a relatively small distance therebetween, at least two or more parts of the end portion 1a, 2a of the electrode can be welded simultaneously to the current collector plate 10, 11 with the fused material by bringing them into contact with part of the current collector plate 10, 11 adjacent to one of the projections 12 formed on the surface of the current collector plate 10, 11.

As explained above, the secondary battery of the present invention has a highly reliable current collecting structure having a stable junction between the end portion of the electrode and the current collector plate and being suitable for high current discharge. In particular, the present invention is effective for high-power lithium ion secondary batteries in which an aluminum or copper foil having a thickness of 50 μm or less, more preferably 20 μm or less, is used as the current collector in the positive electrode plate or the negative electrode plate.

(Modification of First Embodiment)

In the first embodiment, a suitable shape of the projections 12 formed on the surfaces of the current collector plates 10 and 11 is shown in FIG. 3(c). However, the shape of the projections 12 is not limited thereto, and the projections 12 of various shapes can be employed in accordance with the present invention.

FIGS. 9(a) and 9(b) show the shapes of the projections 12 formed on the surface of the current collector plate 10, 11. Such projections 12 can be applicable to the electrode group shown in FIG. 3(a) formed by winding the positive electrode plate 1 and the negative electrode plate 2 with the porous insulating layer interposed therebetween.

FIG. 9(a) shows a modified example of the shape of the projections 12 arranged in a parallel line pattern on the surface of the current collector plate 10, 11. The projections 12 of such shape each having a gap thereinside can easily be formed by pressing the current collector plate 10, 11 made of a flat plate.

The positive electrode plate 1 and the negative electrode plate 2 are wound into a spiral. Therefore, the end portions 1a and 2a of the positive and negative electrode plates 1 and 2 intersect with the projections 12 at various angles when they are brought into contact with the current collector plates 10 and 11. However, the end portions 1a and 2a of the electrodes can reliably be welded to the current collector plates 10 and 11 by setting suitable intervals between the projections 12.

FIG. 9(b) shows a modified example of the shape of the projections 12 formed independently on the surface of the current collector plate 10, 11. This configuration allows spot application of energy to the independent projections 12. Therefore, temperature increase in the welding process can be reduced.

FIGS. 10(a) and 10(b) show an example of the projections 12 suitable used for an electrode group formed by winding the positive electrode plate 1 and the negative electrode plate 2 with the porous insulating layer interposed therebetween and compressing the resulting product into a flat shape.

The projections 12 shown in FIG. 10(a) are formed to extend perpendicular to the long side and the short side of the rectangular current collector plate 10, 11. The thus-formed projections 12 substantially perpendicularly intersect with the end portions 1a and 2a of the positive and negative electrode plates 1 and 2 when they are brought into contact with the current collector plates 10 and 11. Therefore, the end portion 1a, 2a of the electrode can uniformly and reliably be welded to the current collector plate 10, 11.

The projections 12 shown in FIG. 10(b) are formed independently on the surface of the current collector plate 10, 11. In this case, spot application of energy to the independent projections 12 can be performed. Therefore, the temperature increase in the welding process can be reduced.

In the first embodiment, suitable examples of the shape of the gap 12a formed in the projection 12 are shown in FIGS. 5(a)-5(c). However, the shape of the gap 12a is not limited thereto, and the projections 12 having the gaps 12a of various shapes can be employed in accordance with the present invention.

FIGS. 11(a)-11(c) show modified examples of the shape of the gap 12a formed in each projection 12.

The gap 12a shown in FIG. 11(a) is increased in width at its open end. In this case, the fused material obtained by fusing the projections 12 flows on a wide region on the surfaces of the end portion 1a, 2a of the electrode. This is suitable because two or more parts of the end portion 1a, 2a of the electrode can simultaneously be welded to the current collector plate 10, 11.

The gap 12a shown in FIG. 11(b) is decreased in width at its open end. In this case, the fused material obtained by fusing the projections 12 flows on a narrow and deep region on the surfaces of the end portion 1a, 2a of the electrode. This is suitable because the end portion 1a, 2a of the electrode can be joined more rigidly to the current collector plate 10, 11.

The gap 12a shown in FIG. 11(c) has ledge portions (tongues) 12b at its open end. Therefore, the fused material obtained by fusing the projections 12 is guided to the surfaces of the end portion 1a, 2a of the electrode without separating from the current collector plate 10, 11, and a highly reliable joint can be obtained.

In the first embodiment, the end portion 1a, 2a of the electrode is constituted of the portion 1a, 2a uncoated with the material mixture as shown in FIGS. 2(a) and 2(b). In this case, when the current collector constituting the positive electrode plate 1 (or the negative electrode plate 2) is thin, the end portion 1a, 2a of the electrode may possibly be bent when it is brought into contact with the current collector plate 10, 11, or when the joint 9 of the end portion 1a, 2a of the electrode is welded.

Figure 12:
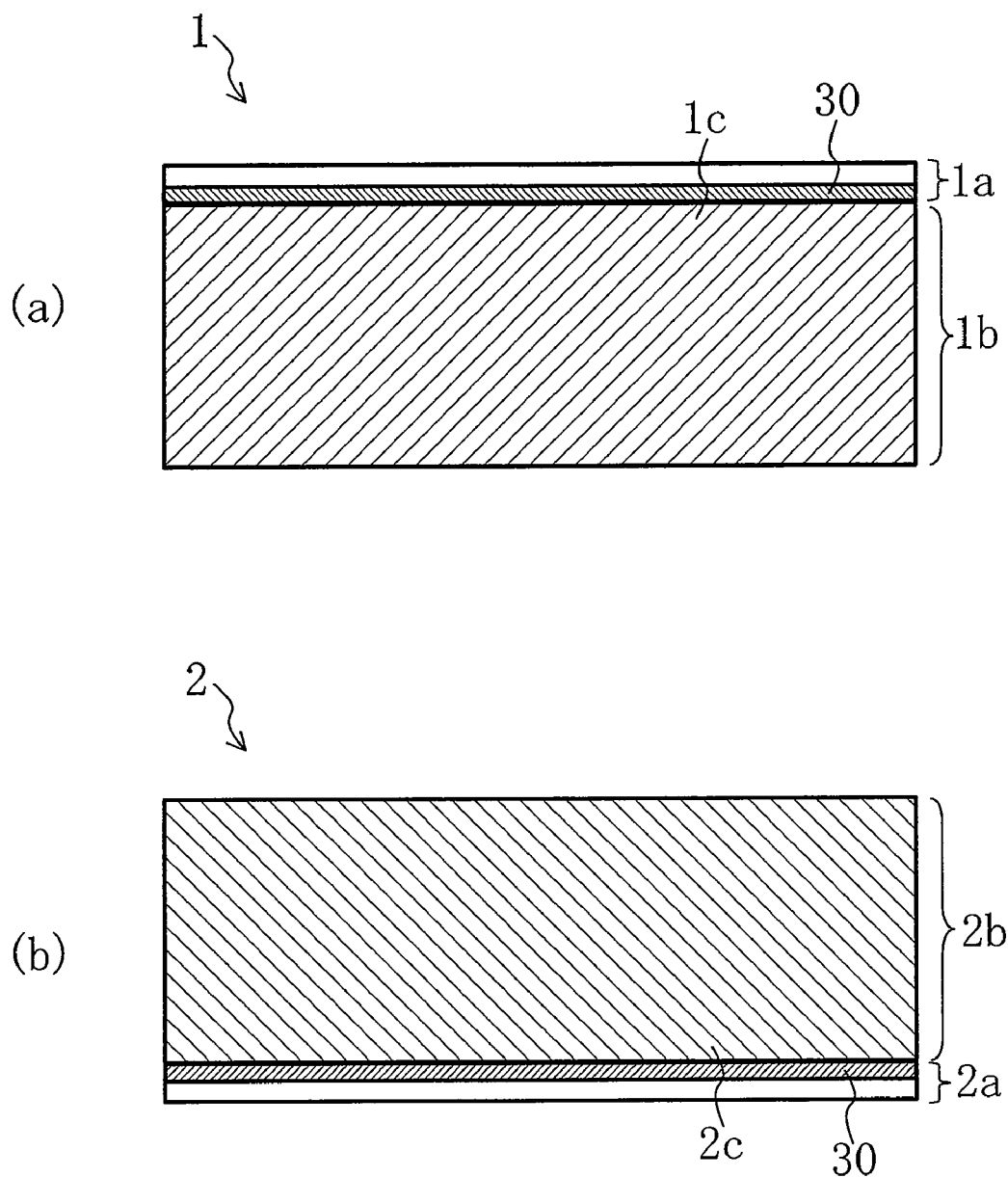
FIGS. 12(a) and 12(b) are developed views of a positive electrode plate and a negative electrode plate according to the modification of the first embodiment.

FIGS. 12(a) and 12(b) show the structures of the positive electrode plate 1 and the negative electrode plate 2 provided with a reinforcing layer 30 formed on part of the end portion 1a of the positive electrode plate 1 and the end portion 2a of the negative electrode plate 2. Specifically, as shown in FIGS. 12(a) and 12(b), the reinforcing layer 30 is formed on part of the uncoated portion 1a, 2a to be welded to the current collector plate 10, 11. The reinforcing layer 30 is preferably as thick as or thinner than the material mixture layer formed on the coated portion 1b, 2b. With the thus-provided reinforcing layer, the end portion 1a, 2a of the electrode can be prevented from bending without reducing the number of turns of the electrode group.

For example, the reinforcing layer 30 may be formed by kneading an inorganic oxide filler such as alumina, a binder and a suitable amount of N-methyl-2-pyrrolidone (hereinafter abbreviated by NMP) to prepare slurry, applying the slurry to the part of the uncoated portion 1a, 2a, and drying the slurry.

Figure 13:
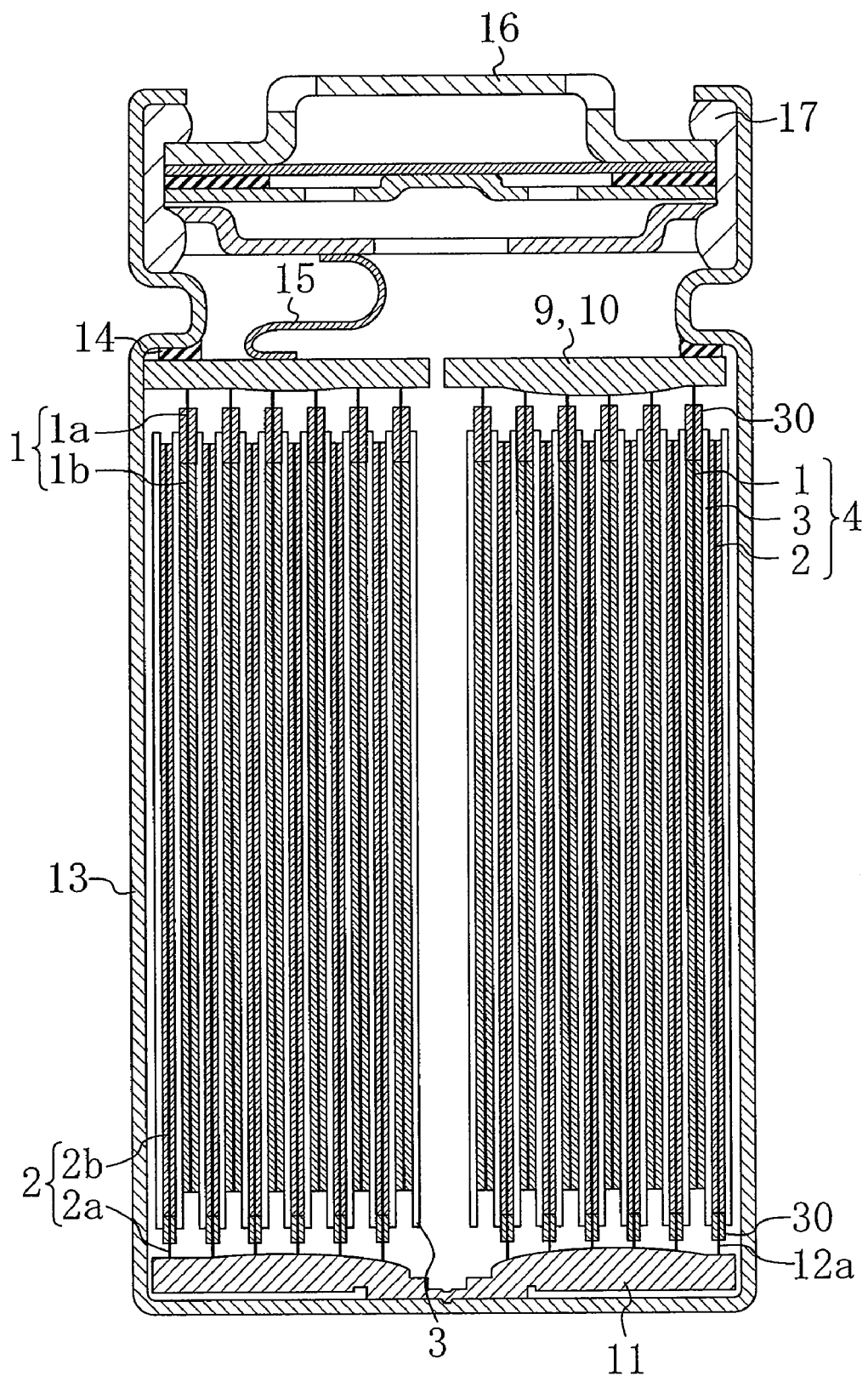
FIG. 13 is a sectional view illustrating the structure of a secondary battery according to the modification of the first embodiment.
Figure 17:
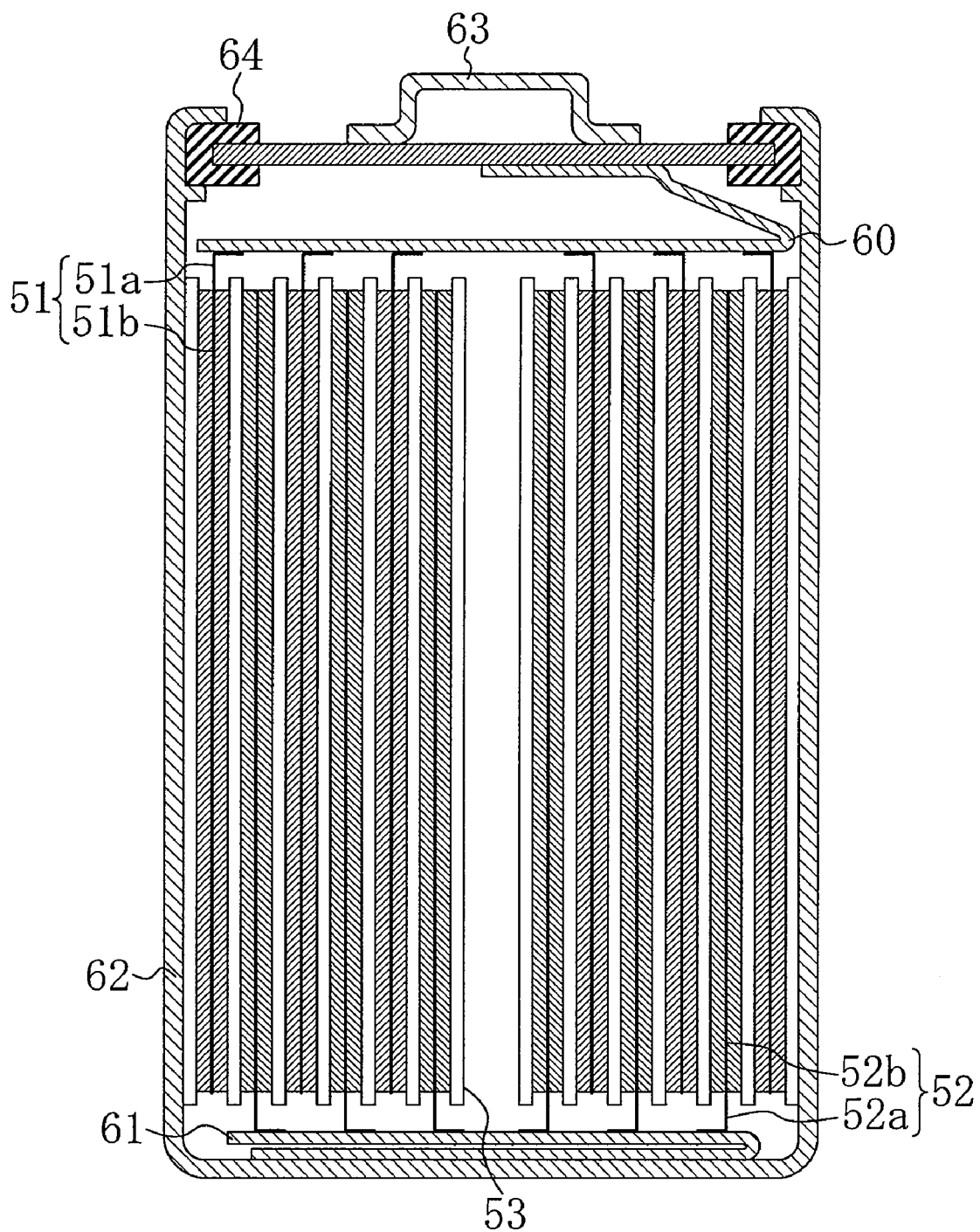
FIG. 17 is a sectional view of the current collecting structure of the conventional secondary battery.
Figure 18:
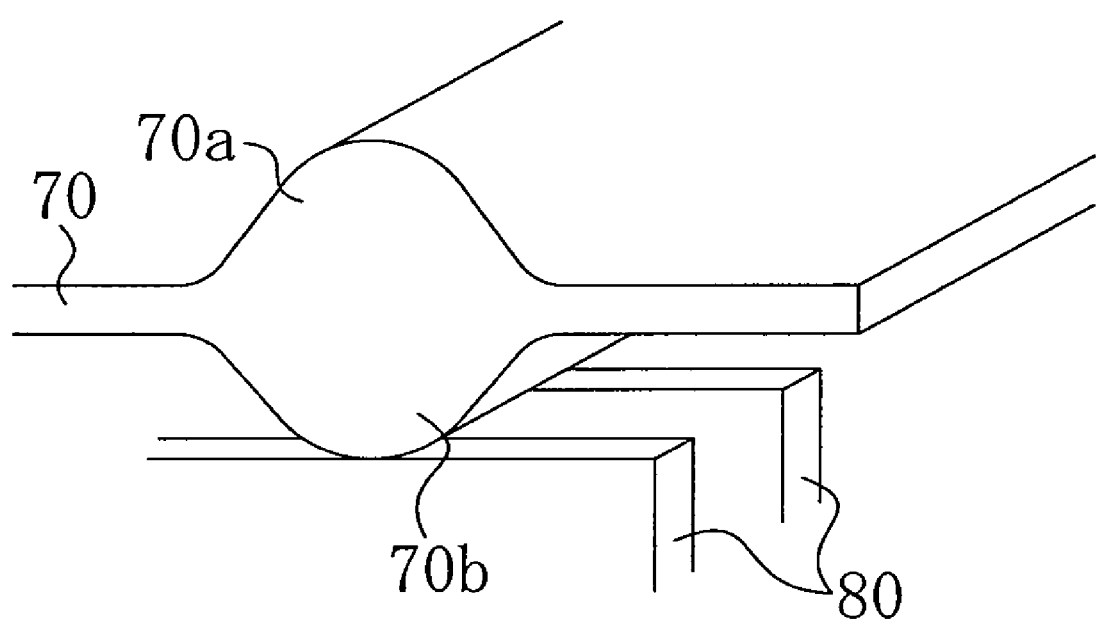
FIG. 18 is a perspective view illustrating the structure of the current collector plate of the conventional secondary battery.

FIG. 13 is a sectional view illustrating the structure of a secondary battery formed by winding the positive electrode plate 1 and the negative electrode plate 2 shown in FIGS. 12(a) and 12(b) with the porous insulating layer 3 interposed therebetween to form the electrode group 4, welding the electrode group 4 to the current collector plates 10 and 11 to form a current collecting structure and placing the current collecting structure in a battery case 13.

Second Embodiment

In the first embodiment, the projection 12 having the gap 12a therein is fused, and the fused material obtained by fusing the projection 12 is guided to the end portion 1a, 2a of the electrode through the gap 12a to weld the end portion 1a, 2a of the electrode to the current collector plate 10, 11. In the present embodiment, the fused material is externally supplied.

FIG. 14(a) is a sectional view schematically illustrating the structure of the current collector plate 10, 11 according to the present embodiment. A plurality of through holes 20 (only one of them is shown in the figure) are formed in the current collector plate 10, 11. For example, with the end portion 1a, 2a of the electrode protruding from the porous insulating layer as shown in FIG. 3(a) or FIG. 6(a) kept in contact with the current collector plate 10, 11 having the plurality of through holes 20, fused metal is fed to the thorough holes 20 so as to join the end portion 1a, 2a of the electrode to the current collector plate 10, 11 by welding.

In the present embodiment, the fused metal fed to the through holes 20 is quickly guided to the end portion 1a, 2a of the electrode via the through holes 20. Therefore, the joint of the end portion 1a, 2a of the electrode can uniformly and reliably be welded. Even in part of the current collector plate 10, 11 not in contact with the end portion 1a, 2a of the electrode, the fused metal fed to the through holes 20 remains in the through holes 20 by interfacial tension. Therefore, the fused metal can be prevented from dropping from the current collector plate 10, 11. In this way, the secondary battery can be provided with a current collecting structure having a stable joint between the end portions 1a, 2a of the electrode and the current collector plate 10, 11 and being suitable for high current discharge.

The fused metal may be supplied, for example, by heating and fusing a welding rod.

The size W of the through hole 20 is preferably not larger than the thickness of the current collector plate 10, 11. Specifically, the size is preferably 0.5 mm or less, more preferably 0.2 mm or less. With this configuration, even in part of the current collector plate 10, 11 not in contact with the end portion 1a, 2a of the electrode, the fused metal fed to the through holes 20 remains in the through holes 20 by interfacial tension, and the fused metal is prevented from dropping from the current collector plate 10, 11 with reliability.

In the same manner as described above in the first embodiment, the shape of the joint 9 of the end portion 1a, 2a of the electrode can be controlled by varying the shape of the through holes 20 formed in the current collector plate 10, 11.

For example, as shown in FIG. 14(b), when the size of the open end of the through hole 20 is larger than the size W of the through hole, the fused metal fed to the through hole 20 is guided to a wide region on the surfaces of the end portion 1a, 2a of the electrode. This is suitable because two or more parts of the end portion 1a, 2a of the electrode can simultaneously be welded to the current collector plate 10, 11.

When the size of the open end of the through hole 20 is smaller than the size W of the through hole as shown in FIG. 14(c), the fused metal fed to the through hole 20 is guided to a narrow and deep region on the surfaces of the end portion 1a, 2a of the electrode. This is suitable because the end portion 1a, 2a of the electrode can be welded more rigidly to the current collector plate 10, 11.

When the ledge portions (or the tongues) are formed at the open end of the through hole 20 as shown in FIG. 14(d), the fused metal fed to the through hole 20 is guided to the surfaces of the end portion 1a, 2a of the electrode without coming off the current collector plate 10, 11. Therefore, the joint can be obtained with high reliability.

FIGS. 15(a)-15(c) illustrate examples of the arrangement of the through holes 20 formed in the current collector plate 10, 11. The example current collector plates 10, 11 may be applied to an electrode group formed by winding the positive electrode plate 1 and the negative electrode plate 2 into a spiral.

FIG. 15(a) shows an example of the through holes formed in the surface of the current collector plate 10, 11 in a parallel line pattern, FIG. 15(b) shows an example of the through holes formed in the surface of the current collector plate 10, 11 in a radial pattern, and FIG. 15(c) illustrates an example of the through holes 20 distributed in the surface of the current collector plate 10, 11.

In the present embodiment, the through holes 20 can be formed by press stamping. That is, the through holes 20 can be formed more easily than the projections 12 according to the first embodiment.

Hereinafter, examples of lithium ion secondary batteries according to the present invention will be described.

Example 1

(1) Manufacture of Positive Electrode Plate 85 parts by weight of lithium cobaltate powder as a positive electrode active material, 10 parts by weight of carbon powder as a conductive agent, and 5 parts by weight of polyvinylidene fluoride (PVDF) as a binder were mixed to prepare a positive electrode material mixture.

The positive material mixture was applied to both surfaces of a positive electrode current collector made of a 15 μm thick, 56 mm wide aluminum foil and dried. Then, a portion of the foil coated with the positive electrode material mixture was rolled to form a 150 μm thick positive electrode plate. The obtained positive electrode plate had a 50 mm wide coated portion and a 6 mm wide uncoated portion.

(2) Manufacture of Negative Electrode Plate

A negative electrode material mixture was prepared by mixing 95 parts by weight of artificial graphite powder as a negative electrode active material and 5 parts by weight of PVDF as a binder.

The negative electrode material mixture was applied to a negative electrode current collector made of a 10 μm thick, 57 mm wide copper foil and dried. Then, a portion of the foil coated with the negative electrode material mixture was rolled to form a 160 μm thick negative electrode plate. The obtained negative electrode plate had a 52 mm wide coated portion and a 5 mm wide uncoated portion.

(3) Manufacture of Electrode Group

The thus-obtained positive and negative electrode plates were wound into a spiral with a 53 mm wide, 25 μm thick microporous film made of polypropylene resin interposed between to cover the positive electrode material mixture-coated portion and the negative electrode material mixture coated-portion. In this way, an electrode group was obtained.

(4) Manufacture of Current Collector Plate

A 0.5 mm thick, 50×50 mm aluminum plate was pressed to form parallel projections each having a height of 1 mm and a gap of 0.2 mm on the surface of the aluminum plate. This aluminum plate was cut by pressing to form a 24 mm diameter disc-shaped positive electrode current collector plate having a 7 mm diameter hole in the center. A negative electrode current collector plate made of a 0.3 mm thick copper plate was formed in the same manner.

(5) Manufacture of Current Collecting Structure

The thus-obtained electrode group was brought into contact with the positive and negative electrode current collector plates and welded to them by TIG (Tungsten Inert Gas) welding to form a current collecting structure. The TIG welding of the positive and negative electrode current collector plates was performed at a current of 120 A for 50 ms.

(6) Manufacture of Lithium Ion Secondary Battery

The thus-obtained current collecting structure was placed in a cylindrical battery case having an opening at one end, and the negative electrode current collector plate was joined to the battery case by resistance welding. Then, the positive electrode current collector plate and a sealing plate was connected by laser welding through an aluminum positive electrode lead with an insulating plate interposed therebetween.

Ethylene carbonate and ethylmethyl carbonate were mixed in a volume ratio of 1:1 to prepare a nonaqueous solvent, and lithium hexafluorophoshate (LiPF6) as a solute was dissolved in the nonaqueous solvent to prepare a nonaqueous electrolyte.

The battery case was heated and dried, and then the nonaqueous electrolyte was injected into the battery case. The battery case was crimped onto the sealing plate with a gasket interposed therebetween. Thus, a cylindrical lithium ion secondary battery (sample 1) having a diameter of 26 mm, a height of 65 mm and a designed capacity of 2600 mAh was manufactured.

Example 2

In Example 2, through holes were formed in the current collector plate.

(1) Manufacture of Current Collector Plate

Through holes each having a diameter of 0.2 mm were formed in a 0.5 mm thick, 50×50 mm aluminum plate in a radial pattern by press stamping. This aluminum plate was cut by pressing to form a 24 mm diameter disc-shaped positive electrode current collector plate having a 7 mm diameter hole in the center. A negative electrode current collector plate made of a 0.3 mm thick copper plate was formed in the same manner.

(2) Manufacture of Current Collecting Structure

An electrode group formed by the same method as described in Example 1 was brought into contact with the positive and negative electrode current collector plates formed as described above. A copper welding rod was fused and the fused metal was fed to the through holes so that the electrode group was welded to the positive and negative electrode current collector plates by TIG welding. Thus, a current collecting structure was obtained. The TIG welding of the positive electrode current collector plate was performed at a current of 120 A for 30 ms, and the TIG welding of the negative electrode current collector plate was performed at a current of 120 A for 50 ms.

(3) Manufacture of Lithium Ion Secondary Battery

Using the thus-formed current collecting structure, a lithium ion secondary battery (sample 2) was manufactured in the same manner as in Example 1.

Example 3

In Example 3, a reinforcing layer was added to the end portions of the positive and negative electrode plates formed in Example 1.

(1) Manufacture of Positive and Negative Electrode Plates

Alumina as an inorganic oxide filler and a binder made of polyacrylonitrile modified rubber were kneaded with N-methyl pyrrolidone (NMP) to prepare slurry of a reinforcing layer.

Then, the prepared slurry was applied to part of the uncoated portion to be in contact with the coated portion of the positive electrode plate and dried to form a 4 mm wide, 62.5 μm thick reinforcing layer. The thickness of the reinforcing layer was almost the same as the thickness of the positive electrode material mixture on the coated portion. A 4 mm wide, 75 μm thick reinforcing layer was also formed on the negative electrode plate by the same method.

(2) Manufacture of Lithium Ion Secondary Battery

Using the positive and negative electrode plates formed in the foregoing method, a lithium ion secondary battery (sample 3) was manufactured in the same manner as in Example 1.

Comparative Example 1

An electrode group was formed using the same positive and negative electrode plates as those of Example 1, and then the end portions of the positive and negative electrode plates were pressed in the winding axis direction to form flat surfaces. The flat surface of the end portion of the positive electrode plate is brought into contact with an aluminum positive electrode current collector plate (0.5 mm in width, 24 mm in diameter) and laser-welded to the positive electrode current collector plate. In the same manner, the flat surface of the end portion of the negative electrode plate was brought into contact with a copper negative electrode current collector plate (0.3 mm in thickness, 24 mm in diameter) and laser-welded to the negative electrode current collector plate. The laser welding of the positive electrode current collector plate was performed at a current of 125 A for 1.2 sec, and the laser welding of the negative electrode current collector plate was performed at a current of 95 A for 1.4 sec.

Using the thus-formed current collecting structure, a lithium ion secondary battery (sample 4) was manufactured in the same manner as described in Example 1.

Comparative Example 2

A 1.5 mm thick aluminum plate was cut by pressing into a 24 mm diameter disc plate having a 7 mm diameter hole in the center. The surface of the aluminum plate was partially cut to form a positive electrode current collector plate provided with 1 mm height projections arranged parallel to each other. In the same manner, a negative electrode current collector plate made of a copper plate (1.3 mm in width) and having the projections was formed.

Using the thus-formed positive and negative electrode current collector plates, a lithium ion secondary battery (sample 5) was manufacture in the same manner as described in Example 1.

Then, the sample lithium ion secondary batteries 1 to 5 were formed, 50 pieces each, for the following evaluation.

(Visual Check of Joint Between the End Portion of the Electrode and the Current Collector Plate)

In any one of the sample batteries 1-3, voids were not formed in the joint and the current collector (electrode plate) was not broken. The void in the joint was observed in some of the sample batteries 4. Further, in some of the sample batteries 4, the fused material was not guided to the end portion of the electrode plate. Many of the sample batteries 5 had the joint with the voids and experienced the break of the current collector (electrode plate). The sample batteries 5 had variations in joint because the fused metal was not guided to the end portion of the electrode plate, or the current collector plate itself was fused and dropped.

(Check of Whether or not the End Portion of the Electrode Plate is Bent)

In the sample batteries 1 and 2, the end portion of the electrode plate was hardly bent to such a degree that the material mixture layer was warped. The end portion was merely slightly bent when it was brought into contact with the current collector plate in the welding process. In the sample batteries 3, the bending was not observed at all due to the presence of the reinforcing layer. In any of the sample batteries 1-3, the material mixture layer did not come off or become damaged. In contrast, in many of the sample batteries 4, the material mixture layer was broken when the end portion of the electrode plate was pressed to form a flat surface. In the sample batteries 5, the bending was not found in the batteries in which the voids were formed in the joint and the current collector was broken. However, in many of the sample batteries 5, it was observed that the material mixture layer was broken and the end portion of the electrode plate was not joined well to the current collector plate.

(Measurement of Tensile Strength)

On the sample batteries 1-5, 5 pieces each, tensile strength between an electrode plate terminal and the current collector plate was measured based on JIS Z2241. Specifically, the electrode group was held at one end of a tensile tester and the current collector plate was held on the other end. In this state, a tension was applied at a constant speed, and a load at which the joint came off was measured as the tensile strength.

As a result, all the sample batteries 1-3 showed a tensile strength of 50N or more. In one of the five sample batteries 4 and three of the five sample batteries 5, the joint came off at a tensile strength of 10 N or less.

(Measurement of Internal Resistance of the Battery)

Each of the sample batteries was charged at a constant current of 1250 mA to 4.2 V and discharged at a constant current of 1250 mA to 3.0 V. After this cycle was repeated three times, an internal resistance of the secondary battery was measured at an AC current of 1 kHz to evaluate the state of connection.

As a result, the sample batteries 1 and 3 showed an average internal resistance of 6 mΩ with about 10% variations. The sample batteries 2 showed an average internal resistance of 5.8 mΩ with about 5% variations.

The average internal resistance of the sample batteries 4 was 11 mΩ with 20% variations. The average internal resistance of the sample batteries 5 was 12.3 mΩ with variations of 30% or more.

When the battery is charged to 4.2 V and then discharged to 1.5 V, a formula R (resistance)×I (current)=Δ2.7 V (voltage) is established. Based on this formula, an average output current (I) of each sample battery was calculated from the internal resistance (R).

Sample batteries 1 and 3 6.0/1000×I=2 . . . . I=450 A
Sample batteries 2 5.8/1000×I=2.7 . . . I=465 A
Sample batteries 4 12.3/1000×I=2.7 . . . I=219 A
Sample batteries 5 11/1000×I=2.7 . . . I=245 A The results indicate that the resistance values of the sample batteries 1-3 are suitable for high current discharge.

The present invention has been explained above by way of the preferable embodiments. The embodiments are not limitative and various modifications are possible. For example, in the above-described embodiments, the surface of part of the current collector plate corresponding to the joint of the end portion of the electrode plate is dished. However, the surface of the current collector plate may have a convex resulted from the remaining of the projection not fused. Further, instead of fusing the projections by TIG welding, they may be fused by applying a laser or an electron beam.

The type of the secondary batteries to which the present invention is applied is not particularly limited. The present invention can be applied to not only the lithium ion secondary batteries, but nickel-hydrogen storage batteries and other batteries. Further, the advantage of the present invention can be obtained even when the invention is applied to an electrochemical element (e.g., a capacitor) having the same current collecting structure as that of the present invention.

INDUSTRIAL APPLICABILITY

The present invention is useful for secondary batteries including a current collecting structure having a stable joint between a positive electrode plate (or a negative electrode plate) and a current collector plate and being suitable for high current discharge. For example, the present invention can be applied to driving batteries for electric tools and electric vehicles that require high output power, and batteries for large capacity backup power sources and storage power sources. The invention can also be applied to capacitors having the same current collecting structure (a capacitor element).

The invention claimed is:

1. A method for manufacturing a secondary battery including an electrode group having a positive electrode plate and a negative electrode plate arranged with a porous insulating layer interposed therebetween, the method comprising the steps of:
   (a) preparing the electrode group having the positive electrode plate and the negative electrode plate arranged in such a manner that the porous insulating layer is interposed therebetween and an end portion of at least one of the positive and negative electrode plates protrudes from the porous insulating layer;
   (b) preparing a current collector plate provided with a plurality of through holes;
   (c) bringing the end portion of the electrode plate protruding from the porous insulating layer into contact with the current collector plate; and
   (d) joining the end portion of the electrode plate to the current collector plate by feeding fused metal to the through holes, wherein the end portion of the electrode plate is welded to the current collector plate in the step (d) with the fused metal guided to the end portion of the electrode plate through the through holes.

2. The method of claim 1, wherein the size of each through hole is not greater than a thickness of the current collector plate.

3. The method of claim 1, wherein the fused metal fed in the step (d) is a fused material obtained by heating and fusing a welding rod.

* * * * *